(12) United States Patent
Tsai et al.

(10) Patent No.: US 8,773,774 B2
(45) Date of Patent: Jul. 8, 2014

(54) PHOTOGRAPHING LENS ASSEMBLY

(71) Applicant: Largan Precision Co., Ltd., Taichung (TW)

(72) Inventors: Tsung-Han Tsai, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 81 days.

(21) Appl. No.: 13/709,071

(22) Filed: Dec. 10, 2012

(65) Prior Publication Data

US 2014/0104705 A1    Apr. 17, 2014

(30) Foreign Application Priority Data

Oct. 15, 2012  (TW) .............................. 101137954 A

(51) Int. Cl.
*G02B 13/18*  (2006.01)
*G02B 3/02*   (2006.01)
*G02B 9/12*   (2006.01)

(52) U.S. Cl.
CPC ...................................... *G02B 13/18* (2013.01)
USPC ............ 359/716; 359/784; 359/791; 359/708

(58) Field of Classification Search
USPC .................................................. 359/716, 784
See application file for complete search history.

(56) References Cited

U.S. PATENT DOCUMENTS

| 7,031,079 | B2 * | 4/2006 | Isono ............................ 359/791 |
| 7,304,807 | B2 * | 12/2007 | Isono ............................ 359/716 |
| 2013/0208366 | A1 * | 8/2013 | Tsai et al. ..................... 359/716 |
| 2014/0071522 | A1 * | 3/2014 | Hsu et al. ...................... 359/356 |

* cited by examiner

*Primary Examiner* — Thomas K Pham
*Assistant Examiner* — Nicholas Pasko
(74) *Attorney, Agent, or Firm* — CKC & Partners Co., Ltd.

(57) ABSTRACT

A photographing lens assembly includes, in order from an object side to an image side, a first lens element, a second lens element and a third lens element. The first lens element with positive refractive power has an object-side surface being concave at a paraxial region thereof and an image-side surface being convex at a paraxial region thereof. The second lens element has positive refractive power. The third lens element with negative refractive power made of plastic material, and has an image-side surface being concave at a paraxial region thereof and being convex at a peripheral region thereof, wherein an object-side surface and the image-side surface of the third lens element are aspheric.

18 Claims, 21 Drawing Sheets

PHOTOGRAPHING LENS ASSEMBLY

RELATED APPLICATIONS

The application claims priority to Taiwan Application Serial Number 101137954, filed Oct. 15, 2012, which is herein incorporated by reference.

BACKGROUND

1. Technical Field

The present invention relates to a photographing lens assembly. More to particularly, the present invention relates to a compact photographing lens assembly applicable to electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

Most of the conventional compact lens systems adopt a two-lens element structure for cutting down the manufacturing cost, such as the optical lens system with two-lens element structure disclosed in U.S. Pat. No. 7,525,741 B1. However, as the optical lens system only has two lens elements, the aberration correction ability of the system is limited, and the system fails to satisfy higher imaging demands. On the other hand, other conventional optical lens systems with four-element lens structure such as the one disclosed in U.S. Pat. No. 8,039,704 B2 are provided. However, a compact size thereof is limited by the number of the lens elements, and the manufacturing costs rise relatively as the manufacturing and assembling processes are more complicated and difficult.

U.S. Pat. No. 7,397,612 B2 provides an optical lens system with three-element lens structure which comprises, in order from an object side to an image side, a first lens element with negative refractive power, a second lens element with positive refractive power, and a third lens element with positive refractive power. Although the field of view can be increased by such an optical lens system, the back focal length is also increased. The total track of length is thereby too long and therefore is not applicable to compact electronic products. Since the surface curvatures have limited ability in correcting the aberration and distortion, it is thereby not favorable for the imaging quality. Besides, the conventional optical lens systems are not suitable to be applied to the infrared photography, since these systems cannot be applied to detect infrared rays at night under the circumstance of insufficient light source or to capture the dynamic images.

SUMMARY

According to one aspect of the present disclosure, a photographing lens assembly includes, in order from an object side to an image side, a first lens element, a second lens element and a third lens element. The first lens element with positive refractive power has an object-side surface being concave at a paraxial region thereof and an image-side surface being convex at a paraxial region thereof. The second lens element has positive refractive power. The third lens element with negative refractive power is made of plastic material, and has an image-side surface being concave at a paraxial region thereof and being convex at a peripheral region thereof, wherein an object-side surface and the image-side surface of the third lens element are aspheric. When a curvature radius of the object-side surface of the first lens element is R1, a curvature radius of the image-side surface of the first lens element is R2, and an f-number of the photographing lens assembly is Fno, the following relationships are satisfied:

$$1.0 < (R1+R2)/(R1-R2) < 2.5; \text{ and}$$

$$1.5 < Fno < 3.0.$$

DETAILED DESCRIPTION

Figure 1:
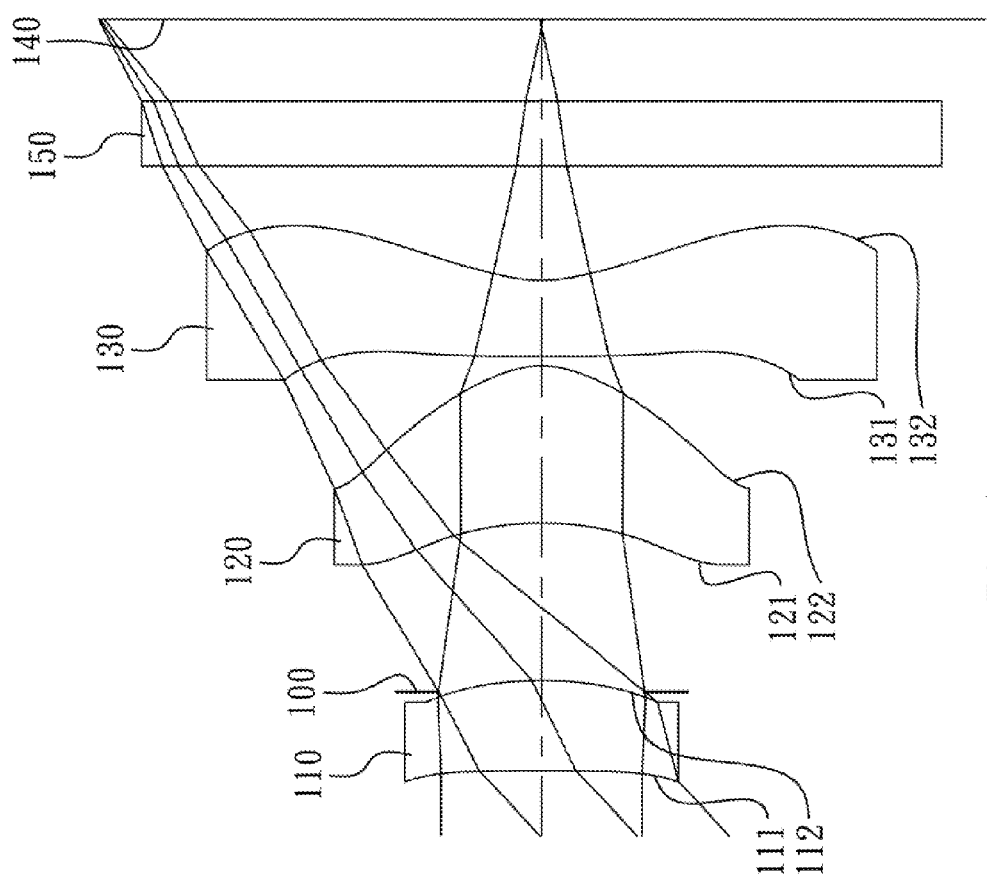
FIG. 1 is a schematic view of a photographing lens assembly according to the 1st embodiment of the present disclosure.

A photographing lens assembly includes, in order from an object side to an image side, a first lens element, a second lens element and a third lens element.

The first lens element with positive refractive power has an object-side surface being concave at a paraxial region thereof and an image-side surface being convex at a paraxial region thereof. Therefore, it is favorable for increasing the field of view of the photographing lens assembly while maintaining a compact size thereof. It is also favorable for minimizing the refractive degree of the incident light so as to reduce the aberration.

The second lens element has positive refractive power and it is favorable for balancing the positive refractive power of the first lens element in order to avoid overloading the refractive power on the first lens element. Accordingly, the sensitivity and the spherical aberration of the photographing lens assembly can be reduced. The second lens element can have an object-side surface being concave at a paraxial region thereof, and an image-side surface being convex at a paraxial region thereof, so that the astigmatism of the photographing lens assembly can be corrected.

The third lens element with negative refractive power has an image-side surface being concave at a paraxial region thereof, so that the principal point of the photographing lens assembly can be positioned away from an image plane, and the back focal length thereof can be reduced so as to maintain the compact size of the photographing lens assembly. The third lens element has the image-side surface being convex at a peripheral region thereof. Therefore, the incident angle of the off-axis field on an image sensor can be effectively reduced for increasing the responding efficiency of the image sensor, and the aberration of the off-axis field can be further corrected.

When a curvature radius of the object-side surface of the first lens element is R1, and a curvature radius of the image-side surface of the first lens element is R2, the following relationship is satisfied: $1.0<(R1+R2)/(R1-R2)<2.5$. Therefore, it is favorable for increasing the field of view while keeping the photographing lens assembly compact. It is also favorable for minimizing the refractive degree of the incident light so as to reduce the aberration. Preferably, the following relationship is satisfied: $1.0<(R1+R2)/(R1-R2)<1.5$.

The photographing lens assembly can include one aperture stop located closer to the object side of the photographing lens assembly than an axial vertex on the image-side surface of the first lens element. Therefore, it is favorable for making a balance between the telecentric effect and the wide angle functionality.

When an f-number of the photographing lens assembly is Fno, the following relationship is satisfied: $1.5<Fno<3.0$. Therefore, the photographing lens assembly with large aperture under insufficient light conditions can still take images with high definition image quality by fast shutter speed and achieve shallow depth of field.

When a distance in parallel with an optical axis from a maximum effective diameter position on the object-side surface of the second lens element to an axial vertex on the object-side surface of the second lens element is SAG21, and when a central thickness of the second lens element is CT2, the following relationship is satisfied: $0.17<|SAG21/CT2|<0.60$. Therefore, it is favorable for manufacturing and assembling the lens elements to increase the yield rate. Furthermore, when the maximum effective diameter position is closer to the object side than the axial vertex, SAG21 has a negative value: and when the maximum effective diameter position is closer to the image side than the axial vertex, SAG21 has a positive value.

When a focal length of the first lens element is f1, and a focal length of the second lens element is f2, the following relationship is satisfied: $0.20<f2/f1<0.85$. It is favorable for reducing the spherical aberration and sensitivity of the photographing lens assembly.

When a maximal field of view of the photographing lens assembly is FOV, the following relationship is satisfied: 75 deg.$<$FOV$<$100 deg. It provides a larger field of view while preventing the images from being distorted.

When the focal length of the second lens element is f2, and a focal length of the third lens element is f3, the following relationship is satisfied: $0.65<|f2/f3|<1.3$. It is favorable for reducing the total track length of the photographing lens assembly by the positive-negative telephoto structure. Preferably, the following relationship is satisfied: $0.75<|f2/f3|<1.1$.

When a central thickness of the first lens element is CT1, the central thickness of the second lens element is CT2, and a central thickness of the third lens element is CT3, the following relationship is satisfied: $CT3 \leq CT1 < CT2$. Therefore, it is favorable for avoiding the lens elements with an excessively thin thickness or an excessively thick thickness, and thereby it provides favorable moldability and homogeneity for plastic lens elements during the injection molding process.

When a maximum central thickness of a lens element among the first lens element, the second lens element and the third lens element of the photographing lens assembly is CTmax, the following relationship is satisfied: 0.30 mm$<$CTmax$<$0.95 mm. Therefore, it provides favorable moldability and homogeneity for plastic lens elements during the injection molding process and thereby the photographing lens assembly achieves superior image quality.

When the central thickness of the first lens element is CT1, and an axial distance between the first lens element and the second lens element is T12, the following relationship is satisfied: $0.2<CT1/T12<1.0$. Therefore, it is favorable for assembling the lens elements to increase the manufacturing yield rate.

When the curvature radius of the image-side surface of the first lens element is R2, and a focal length of the photographing lens assembly is f, the following relationship is satisfied: $-1.2<R2/f<-0.4$. It is favorable for minimizing the refractive degree of the incident light so as to reduce the to aberration.

When a curvature radius of an object-side surface of the third lens element is R5, and a curvature radius of the image-side surface of the third lens element is R6, the following relationship is satisfied: $-0.5<(R5+R6)/(R5-R6)<1.25$. The principal point of the photographing lens assembly can be positioned away from the image plane, and thereby the back focal length can be reduced to keep the photographing lens assembly compact. Preferably, the following relationship is satisfied: $0<(R5+R6)/(R5-R6)<1.15$.

When the curvature radius of the object-side surface of the first lens element is R1 and the focal length of the photographing lens assembly is f, the following relationship is satisfied: −20<f/R1<−0.03. It is favorable for increasing the field of view and keeping the photographing lens assembly compact.

The photographing lens assembly is applicable to the infrared wavelength range of 780 nm~950 nm. That is, the photographing lens assembly can be applied to detect infrared rays at night under the circumstance of insufficient light source or to capture the dynamic images.

According to the photographing lens assembly of the present disclosure, the lens elements thereof can be made of glass or plastic material. When the lens elements are made of glass material, the distribution of the refractive power of the photographing lens assembly may be more flexible to design. When the lens elements are made of plastic material, the manufacturing cost can be effectively reduced. Furthermore, surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the photographing lens assembly can also be reduced.

According to the photographing lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex; and when the lens element has a concave surface, it indicates that the paraxial region of the surface is concave.

According to the photographing lens assembly of the present disclosure, the photographing lens assembly can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the assembly to an image plane and thereby the generated telecentric effect improves the image-sensing efficiency of an image sensor. A middle stop which can be disposed between the first lens element and the image plane is favorable for enlarging the field of view of the system and thereby provides a wider field of view for the same.

According to the photographing lens assembly of the present disclosure, the photographing lens assembly is featured with good correcting ability and high image quality, and can be applied to 3D (three-dimensional) image capturing applications, in products such as digital cameras, mobile devices and tablets. In particular, the photographing lens assembly can be applied to the infrared photography with the infrared wavelength range.

According to the above description of the present disclosure, the following 1st-10th specific embodiments are provided for further explanation.

1st Embodiment

Figure 2:
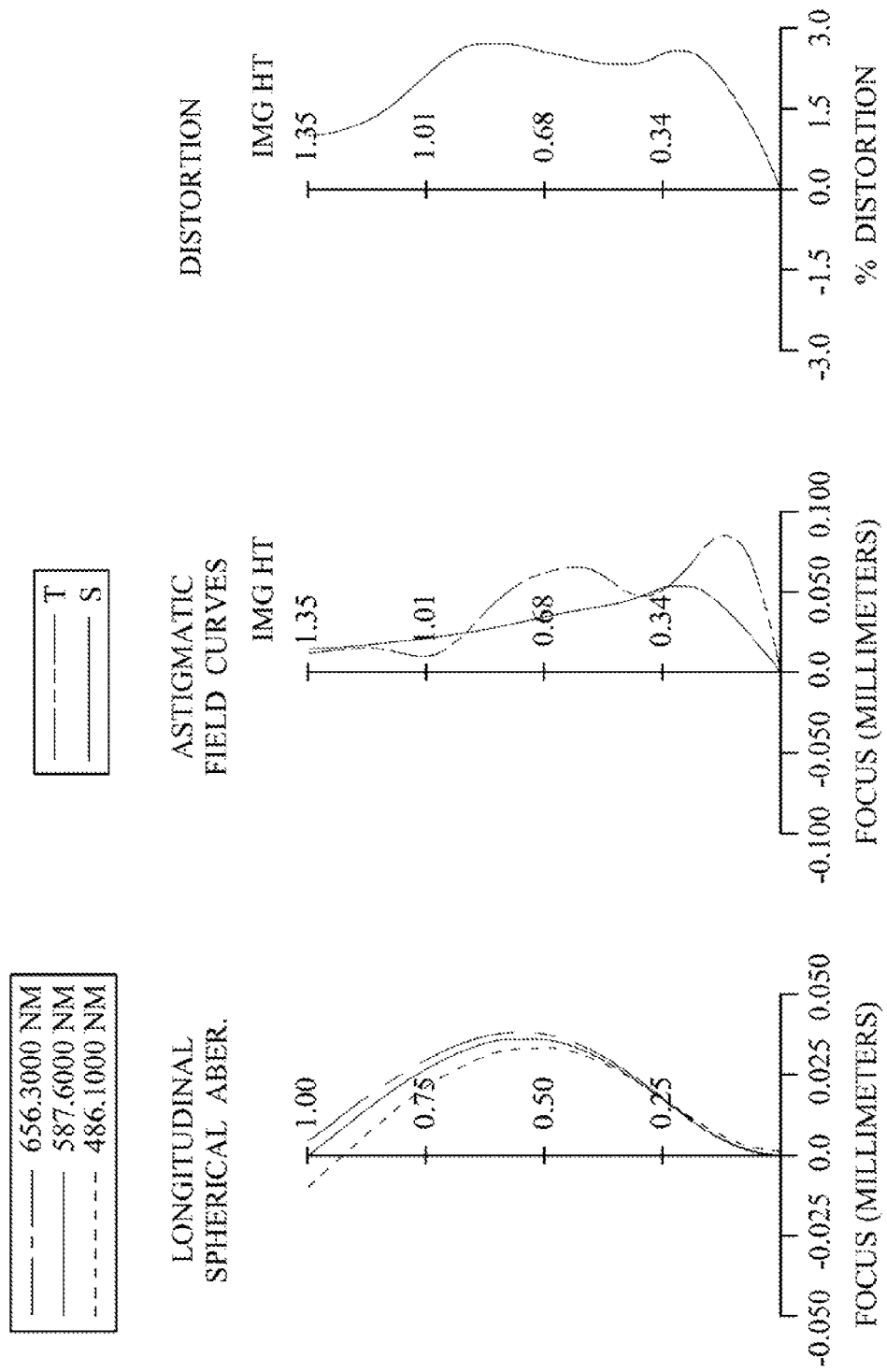
FIG. 2 shows spherical aberration curves, astigmatic field curves and a distortion curve of the photographing lens assembly according to the 1st embodiment.

FIG. 1 is a schematic view of a photographing lens assembly according to the 1st embodiment of the present disclosure. FIG. 2 shows spherical aberration curves, astigmatic field curves and a distortion curve of the photographing lens assembly according to the 1st embodiment. In FIG. 1, the photographing lens assembly includes, in order from an object side to an image side, a first lens element 110, an aperture stop 100, a second lens element 120, a third lens element 130, a filter 150 and an image plane 140.

The first lens element 110 with positive refractive power has an object-side surface 111 being concave at a paraxial region thereof and an image-side surface 112 being convex at a paraxial region thereof. The first lens element 110 is made of plastic material (for example, APEL-5514ML), and has the object-side surface 111 and the image-side surface 112 being aspheric. Moreover, the aperture stop 100 is located closer to the object side of the photographing lens assembly than an axial vertex on the image-side surface 112 of the first lens element 110.

The second lens element 120 with positive refractive power has an to object-side surface 121 being concave at a paraxial region thereof and an image-side surface 122 being convex at a paraxial region thereof. The second lens element 120 is made of plastic material (for example, ZEONEX F52R), and has the object-side surface 121 and the image-side surface 122 being aspheric.

The third lens element 130 with negative refractive power has an object-side surface 131 being concave at a paraxial region thereof, and an image-side surface 132 being concave at a paraxial region thereof and being convex at a peripheral region thereof. The third lens element 130 is made of plastic material (for example, TEIJIN SP3810), and has the object-side surface 131 and the image-side surface 132 being aspheric.

The filter 150 made of glass (for example, HOYA BSC7) is located between the third lens element 130 and the image plane 140, and will not affect a focal length of the photographing lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k)\times(Y/R)^2)) + \sum_i (Ai)\times(Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the photographing lens assembly according to the 1st embodiment, when the focal length of the photographing lens assembly is f, an f-number of the photographing lens assembly is Fno, and half of a maximal field of view of the photographing lens assembly is HFOV, these parameters have the following values:

f=1.41 mm;

Fno=2.30; and

HFOV=43.0 degrees.

In the photographing lens assembly according to the 1st embodiment, when a central thickness of the first lens element 110 is CT1, an axial distance between the first lens element 110 and the second lens element 120 is T12, and a maximum central thickness of a lens element among the first lens element 110, the second lens element 120 and the third lens element 130 of the photographing lens assembly is CTmax, the following relationships are satisfied:

$CT1/T12=0.58$; and $CTmax=0.48$ mm.

In the photographing lens assembly according to the 1st embodiment, when the focal length of the photographing lens assembly is f, a curvature radius of the object-side surface 111 of the first lens element 110 is R1 and a curvature radius of the image-side surface 112 of the first lens element 110 is R2, the following relationships are satisfied:

$f/R1=-0.01$;

$R2/f=-0.80$; and $(R1+R2)/(R1-R2)=1.02$.

In the photographing lens assembly according to the 1st embodiment, when a curvature radius of the object-side surface 131 of the third lens element 130 is R5, and a curvature radius of the image-side surface 132 of the third lens element 130 is R6, the following relationship is satisfied:

$(R5+R6)/(R5-R6)=0.95$.

In the photographing lens assembly according to the 1st embodiment, when a focal length of the first lens element 110 is f1, a focal length of the second lens element 120 is f2, and a focal length of the third lens element 130 is f3, the following relationships are satisfied:

$f2/f1=0.28$; and $|f2/f3|=0.93$.

In the photographing lens assembly according to the 1st embodiment, when the maximal field of view of the photographing lens assembly is FOV, the following relationship is satisfied: FOV=86.0 deg.

Figure 21:
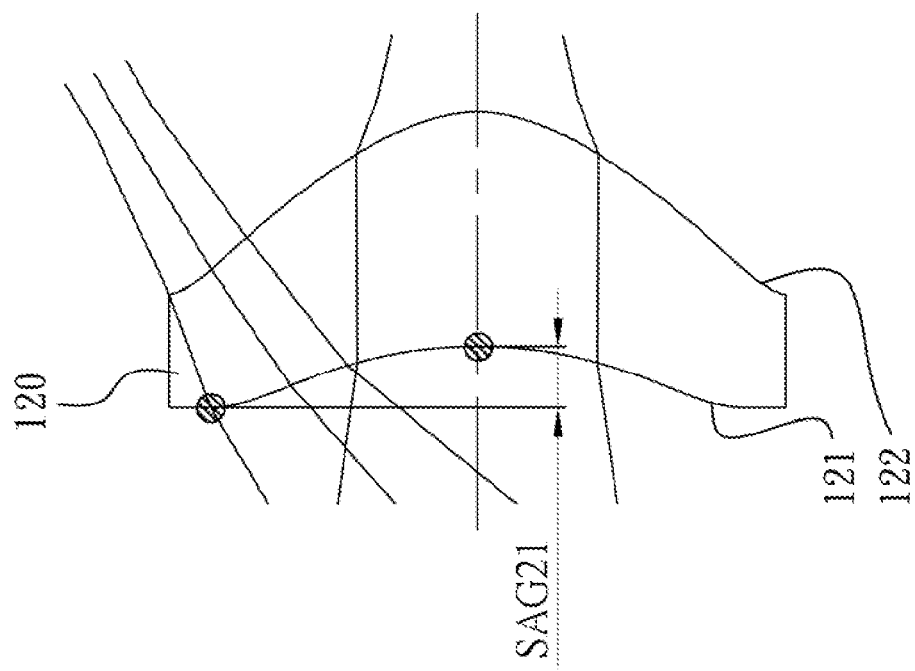
FIG. 21 shows the SAG21 of the second lens element of the photographing lens assembly as illustrated in FIG. 1.

FIG. 21 shows the SAG21 of the second lens element 120 of the photographing lens assembly as illustrated in FIG. 1. As depicted in FIG. 21, when a distance in parallel with an optical axis from a maximum effective diameter position on the object-side surface 121 of the second lens element 120 to an axial vertex on the object-side surface 121 of the second lens element 120 is SAG21, and a central thickness of the second lens element 120 is CT2, the following relationship is satisfied: $|SAG21/CT2|=0.26$.

The detailed optical data of the 1st embodiment are shown in Table 1 and the aspheric surface data are shown in Table 2 below.

TABLE 1

1st Embodiment
f = 1.41 mm, Fno = 2.30, HFOV = 43.0 deg.

| Surface # | | Curvature Radius | Thickness | Material | Index | Focal length |
|---|---|---|---|---|---|---|
| 0 | Object | Plano | Infinity | | | |
| 1 | Lens 1 | −100.000 (ASP) | 0.277 | Plastic | APEL-5514ML 1.544 | 2.09 |
| 2 | | −1.127 (ASP) | −0.035 | | | |
| 3 | Ape. Stop | Plano | 0.515 | | | |
| 4 | Lens 2 | −0.995 (ASP) | 0.483 | Plastic | ZEONEX F52R 1.535 | 0.59 |
| 5 | | −0.281 (ASP) | 0.030 | | | |
| 6 | Lens 3 | −15.758 (ASP) | 0.230 | Plastic | TEIJIN SP3810 1.640 | −0.64 |
| 7 | | 0.422 (ASP) | 0.350 | | | |
| 8 | Filter | Plano | 0.200 | Glass | HOYA BSC7 1.517 | — |
| 9 | | Plano | 0.251 | | | |
| 10 | Image | Plano | — | | | |

Note:
Reference wavelength (d-line) is 587.6 nm.

TABLE 2

| Aspheric Coefficients | | | | | | |
|---|---|---|---|---|---|---|
| Surface # | 1 | 2 | 4 | 5 | 6 | 7 |
| k = | −1.0000E+00 | −2.3026E+01 | −5.0220E−02 | −4.0873E+00 | −1.0000E+00 | −9.7878E+00 |
| A4 = | −7.3241E−01 | −2.6331E+00 | −1.0994E+00 | −3.9477E+00 | 1.2076E+00 | 2.6959E−01 |
| A6 = | −3.4648E+00 | 1.3779E+01 | 1.6614E+01 | 3.1511E+01 | −4.3608E+00 | −1.4655E+00 |
| A8 = | 1.9100E+01 | −7.1253E+01 | −1.4178E+02 | −1.5328E+02 | 2.9401E+00 | 1.9815E+00 |
| A10 = | −6.4713E+01 | 1.6927E+02 | 6.9384E+02 | 3.8547E+02 | 4.8903E+00 | −1.3566E+00 |
| A12 = | −7.2139E+00 | −1.0581E+01 | −1.5590E+03 | −4.4025E+02 | −7.5238E+00 | 4.5629E−01 |
| A14 = | 1.3851E+02 | −4.2333E+02 | 1.3102E+03 | 1.8262E+02 | 1.8817E+00 | −7.0659E−02 |

In Table 1, the curvature radius, the thickness and the focal length are shown in millimeters (mm). Surface numbers 0-10 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
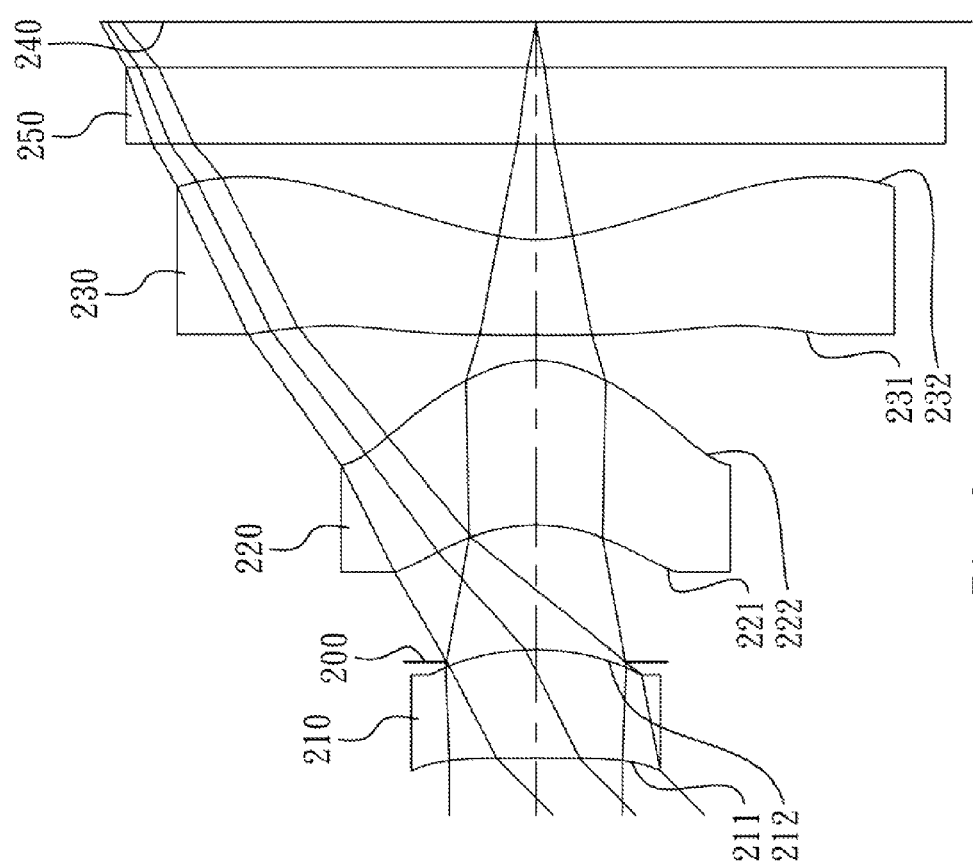
FIG. 3 is a schematic view of a photographing lens assembly according to the 2nd embodiment of the present disclosure.
Figure 4:
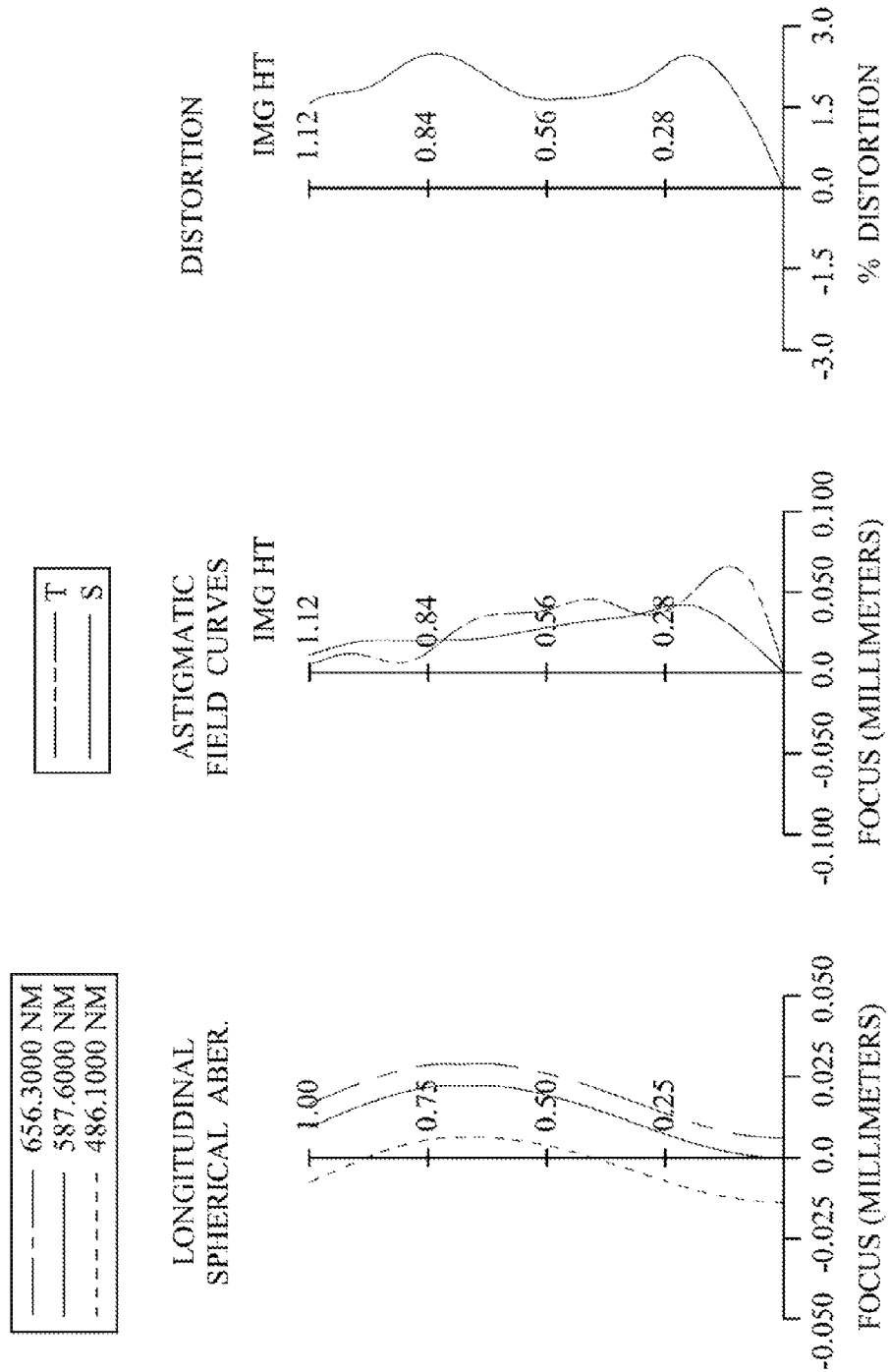
FIG. 4 shows spherical aberration curves, astigmatic field curves and a distortion curve of the photographing lens assembly according to the 2nd embodiment.

FIG. 3 is a schematic view of a photographing lens assembly according to the 2nd embodiment of the present disclosure. FIG. 4 shows spherical aberration curves, astigmatic field curves and a distortion curve of the photographing lens assembly according to the 2nd embodiment. In FIG. 3, the is photographing lens assembly includes, in order from an object side to an image side, a first lens element 210, an aperture stop 200, a second lens element 220, a third lens element 230, a filter 250 and an image plane 240.

The first lens element 210 with positive refractive power has an object-side surface 211 being concave at a paraxial region thereof and an image-side surface 212 being convex at a paraxial region thereof. The first lens element 210 is made of plastic material (for example, APEL-5514ML), and has the object-side surface 211 and the image-side surface 212 being aspheric. Moreover, the aperture stop 200 is located closer to the object side of the photographing lens assembly than an axial vertex on the age-side surface 212 of the first lens element 210.

The second lens element 220 with positive refractive power has an object-side surface 221 being concave at a paraxial region thereof, and an image-side surface 222 being convex at a paraxial region thereof. The second lens element 220 is made of plastic material (for example, APEL-5514ML), and has the object-side surface 221 and the image-side surface 222 being aspheric.

The third lens element 230 with negative refractive power has an object-side surface 231 being concave at a paraxial region thereof, and an image-side surface 232 being concave at a paraxial region thereof and being convex at a peripheral region thereof. The third lens element 230 is made of plastic material (for example, APEL-5514ML), and has the object-side surface 231 and the image-side surface 232 being aspheric.

The filter 250 made of glass (for example, HOYA BSC7) is located between the third lens element 230 and the image plane 240, and will not affect a focal length of the photographing lens assembly.

The detailed optical data of the 2nd embodiment are shown in Table 3 and the aspheric surface data are shown in Table 4 below.

TABLE 3

2nd Embodiment
f = 1.11 mm, Fno = 2.46, HFOV = 44.5 deg.

| Surface # | | Curvature Radius | Thickness | Material | Index | Focal length |
|---|---|---|---|---|---|---|
| 0 | Object | Plano | Infinity | | | |
| 1 | Lens 1 | −28.952 (ASP) | 0.283 | Plastic APEL-5514ML | 1.544 | 1.26 |
| 2 | | −0.673 (ASP) | −0.031 | | | |
| 3 | Ape. Stop | Plano | 0.356 | | | |
| 4 | Lens 2 | −0.478 (ASP) | 0.432 | Plastic APEL-5514ML | 1.544 | 0.69 |
| 5 | | −0.278 (ASP) | 0.066 | | | |
| 6 | Lens 3 | −97.392 (ASP) | 0.250 | Plastic APEL-5514ML | 1.544 | −0.82 |
| 7 | | 0.446 (ASP) | 0.250 | | | |
| 8 | Filter | Plano | 0.200 | Glass HOYA BSC7 | 1.517 | — |
| 9 | | Plano | 0.119 | | | |
| 10 | Image | Plano | — | | | |

Note:
Reference wavelength (d-line) is 587.6 nm.

TABLE 4

Aspheric Coefficients

| Surface # | 1 | 2 | 4 | 5 | 6 | 7 |
|---|---|---|---|---|---|---|
| k = | 3.0000E+00 | −9.0292E+00 | −6.6353E−01 | −4.4030E+00 | −1.0000E+00 | −9.4250E+00 |
| A4 = | −1.5532E+00 | −4.9785E+00 | −1.0126E−00 | −8.5268E+00 | 1.3242E+00 | −1.4466E−01 |
| A6 = | −1.4268E+01 | 3.3005E+01 | 3.4339E+01 | 9.2867E+01 | −4.5305E+00 | 5.6018E−01 |
| A8 = | 9.1425E+01 | −2.8446E+02 | −4.0893E+02 | −6.0230E+02 | 1.3634E+00 | −1.9485E+00 |
| A10 = | −5.2699E+02 | 1.1264E+03 | 3.7392E+03 | 2.1097E+03 | 1.0918E+01 | 1.8434E+00 |
| A12 = | −3.3228E+02 | −2.5892E−05 | −1.1593E+04 | −3.1235E+03 | −1.3170E+01 | −1.3751E−01 |
| A14 = | −2.8137E+03 | −6.3531E−05 | 8.7889E−05 | 1.0830E+03 | 3.2818E+00 | −3.6637E−01 |

In the photographing lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 1.11 | (R1 + R2)/(R1 − R2) | 1.05 |
| Fno | 2.46 | (R5 + R6)/(R5 − R6) | 0.99 |
| HFOV (deg.) | 44.5 | f2/f1 | 0.55 |
| CT1/T12 | 0.87 | |f2/f3| | 0.85 |
| CTmax (mm) | 0.43 | FOV (deg.) | 89.0 |
| f/R1 | −0.04 | |SAG21/CT2| | 0.28 |
| R2/f | −0.61 | | |

3rd Embodiment

Figure 5:
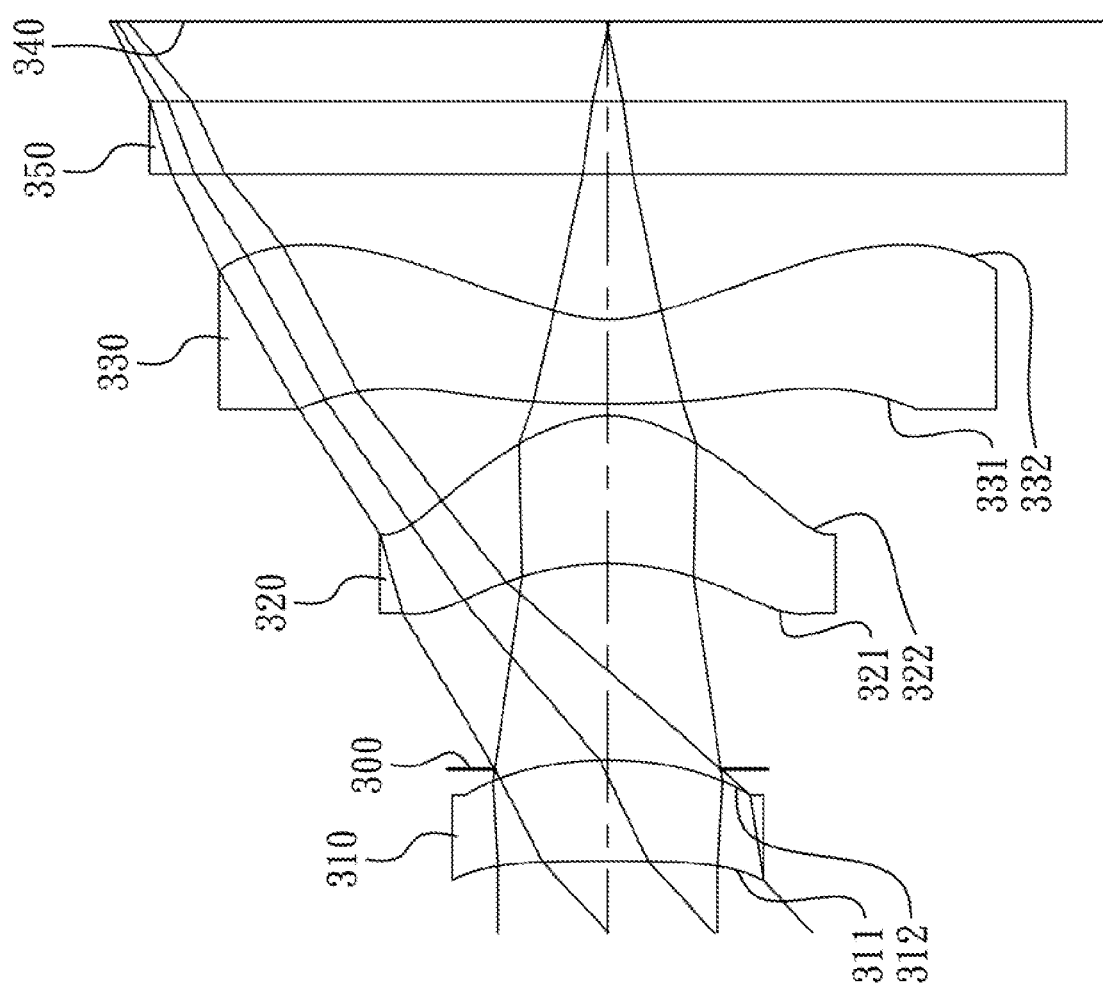
FIG. 5 is a schematic view of a photographing lens assembly according to the 3rd embodiment of the present disclosure.
Figure 6:
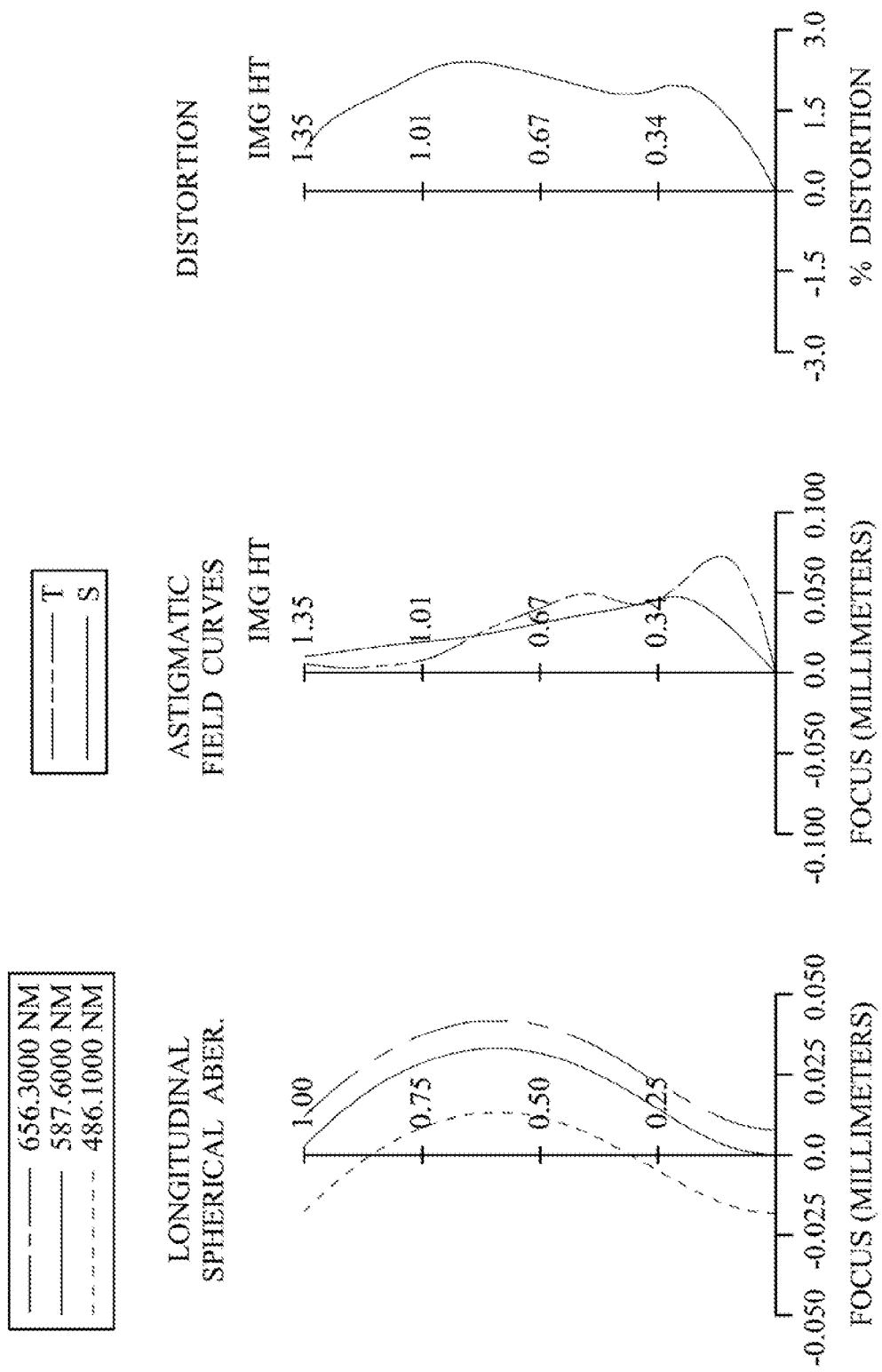
FIG. 6 shows spherical aberration curves, astigmatic field curves and a distortion curve of the photographing lens assembly according to the 3rd embodiment.

FIG. 5 is a schematic view of a photographing lens assembly according to the 3rd embodiment of the present disclosure. FIG. 6 shows spherical aberration curves, astigmatic field curves and a distortion curve of the photographing lens assembly according to the 3rd embodiment. In FIG. 5, the photographing lens assembly includes, in order from an object side to an image side, a first lens element 310 an aperture stop 300, a second lens element 320, a third lens element 330, a filter 350 and an image plane 340.

The first lens element 310 with positive refractive power has an object-side surface 311 being concave at a paraxial region thereof and an image-side surface 312 being convex at a paraxial region thereof. The first lens element 310 is made of plastic material (for example, APEL-5514ML), and has the object-side surface 311 and the image-side surface 312 being aspheric. Moreover, the aperture stop 300 is located closer to the object side of the photographing lens assembly than an axial vertex on the mage-side surface 312 of the first lens element 310.

The second lens element 320 with positive refractive power has an abject-side surface 321 being concave at a paraxial region thereof, and an image-side surface 322 being convex at a paraxial region thereof. The second lens element 320 is made of plastic material (for example, APEL-5514ML) and has the object-side surface 321 and the image-side surface 322 being aspheric.

The third lens element 330 with negative refractive power has an object-side surface 331 being convex at a paraxial region thereof, and an image-side surface 332 being concave at a paraxial region thereof and being convex at a peripheral region thereof. The third lens element 330 is made of plastic material (for example, APEL-5514ML), and has the object-side surface 331 and the image-side surface 332 being aspheric.

The filter 350 made of glass (for example, HOYA BSC7) is located between the third lens element 330 and the image plane 340, and will not affect a focal length of the photographing lens assembly.

The detailed optical data of the 3rd embodiment are shown in Table 5 and the aspheric surface data are shown in Table 6 below

TABLE 5

3rd Embodiment
f = 1.45 mm, Fno = 2.40, HFOV = 42.4 deg.

| Surface # | | Curvature Radius | Thickness | Material | Index | Focal length |
|---|---|---|---|---|---|---|
| 0 | Object | Plano | Infinity | | | |
| 1 | Lens 1 | −9.467 (ASP) | 0.277 | Plastic | APEL-5514ML 1.544 | 2.04 |
| 2 | | −1.005 (ASP) | −0.025 | | | |
| 3 | Ape. Stop | Plano | 0.564 | | | |
| 4 | Lens 2 | −0.778 (ASP) | 0.408 | Plastic | APEL-5514ML 1.544 | 0.71 |
| 5 | | −0.305 (ASP) | 0.033 | | | |
| 6 | Lens 3 | 4.400 (ASP) | 0.230 | Plastic | APEL-5514ML 1.544 | −0.79 |
| 7 | | 0.384 (ASP) | 0.400 | | | |
| 8 | Filter | Plano | 0.200 | Glass | HOYA BSC7 1.517 | — |
| 9 | | Plano | 0.220 | | | |
| 10 | Image | Plano | — | | | |

Note:
Reference wavelength (d-line) is 587.6 nm.

TABLE 6

Aspheric Coefficients

| Surface # | 1 | 2 | 4 | 5 | 6 | 7 |
|---|---|---|---|---|---|---|
| k = | −1.0000E+00 | −1.6602E+01 | −5.8302E−01 | −4.2789E+00 | −1.0000E+00 | −7.5554E+00 |
| A4 = | −8.5915E−01 | −2.7551E+00 | −9.8013E−01 | −4.1262E+00 | 7.9660E−01 | 2.1323E−01 |
| A6 = | −3.6887E+00 | 1.3588E+01 | 1.7377E+01 | 3.1374E+01 | −3.3170E+00 | −1.2515E+00 |
| A8 = | 1.9274E+01 | −7.1108E+01 | −1.3986E+02 | −1.4955E+02 | 2.4084E+00 | 1.7963E+00 |
| A10 = | −6.5347E+01 | 1.7052E+02 | 6.8826E+02 | 3.8784E+02 | 4.1770E+00 | −1.3956E+00 |
| A12 = | −2.4896E+01 | −1.8223E+01 | −1.5670E+03 | −4.4807E+02 | −7.7804E+00 | 6.0043E−01 |
| A14 = | 2.7859E+01 | −4.7141E+02 | 1.3224E+03 | 1.7637E+02 | 3.5469E+00 | −1.2572E−01 |

In the photographing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 1.45 | (R1 + R2)/(R1 − R2) | 1.24 |
| Fno | 2.40 | (R5 + R6)/(R5 − R6) | 1.19 |
| HFOV (deg.) | 42.4 | f2/f1 | 0.35 |
| CT1/T12 | 0.51 | \|f2/f3\| | 0.90 |
| CTmax (mm) | 0.41 | FOV (deg.) | 84.8 |
| f/R1 | −0.15 | \|SAG21/CT2\| | 0.33 |
| R2/f | −0.69 | | |

4th Embodiment

Figure 7:
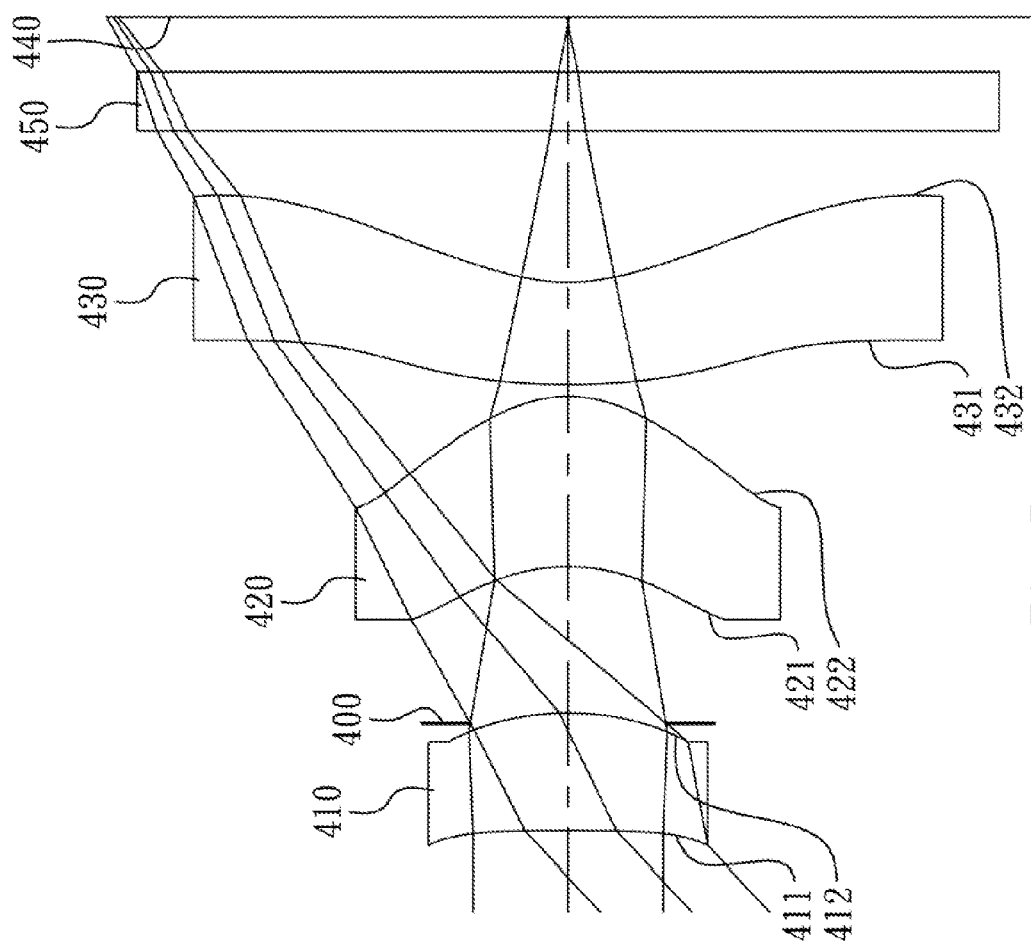
FIG. 7 is a schematic view of a photographing lens assembly according to the 4th embodiment of the present disclosure.
Figure 8:
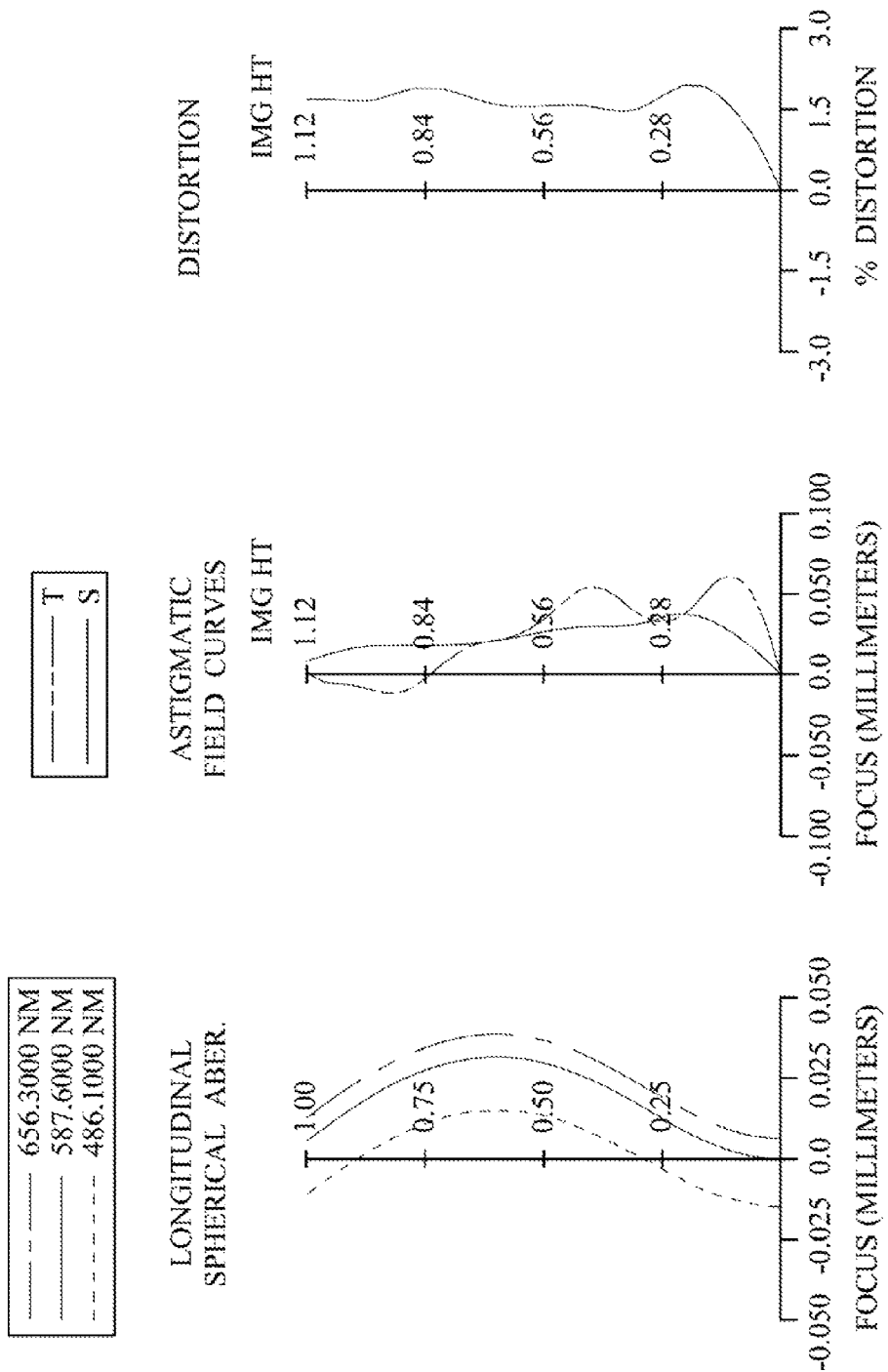
FIG. 8 shows spherical aberration curves, astigmatic field curves and a distortion curve of the photographing lens assembly according to the 4th embodiment.

FIG. 7 is a schematic view of a photographing lens assembly according to to the 4th embodiment of the present disclosure. FIG. 8 shows spherical aberration curves, astigmatic field curves and a distortion curve of the photographing lens assembly according to the 4th embodiment. In FIG. 7, the photographing lens assembly includes, in order from an object side to an image side, a first lens element 410, an aperture stop 400, a second lens element 420, a third lens element 430, a filter 450 and an image plane 440.

The first lens element 410 with positive refractive power has an object-side surface 411 being concave at a paraxial region thereof and an image-side surface 412 being convex at a paraxial region thereof. The first lens element 410 is made of plastic material (for example, ZEONEX F52R), and has the object-side surface 411 and the image-side surface 412 being aspheric. Moreover, the aperture stop 400 is located closer to the object side of the photographing lens assembly than to an axial vertex on the age-side surface 412 of the first lens element 410.

The second lens element 420 with positive refractive power has an object-side surface 421 being concave at a paraxial region thereof, and an image-side surface 422 being convex at a paraxial region thereof. The second lens element 420 is made of plastic material (for example, ZEONEX F52R), and has the object-side surface 421 and the image-side surface 422 being aspheric The third lens element 430 with negative refractive power has an object-side surface 431 being convex at a paraxial region thereof, and an image-side surface 432 being concave at a paraxial region thereof and being convex at a peripheral region thereof. The third lens element 430 is made of plastic material (for example, ZEONEX F52R), and has the object-side surface 431 and the image-side surface 432 being aspheric.

The filter 450 made of glass (for example, HOYA BSC7) is located between the third lens element 430 and the image plane 440, and will not affect a focal length of the photographing lens assembly.

The detailed optical data of the 4th embodiment are shown in Table 7 and the aspheric surface data are shown in Table 8 below.

TABLE 7

4th Embodiment
f = 1.17 mm, Fno = 2.50, HFOV = 42.9 deg.

| Surface # | | Curvature Radius | Thickness | Material | | Index | Focal length |
|---|---|---|---|---|---|---|---|
| 0 | Object | Plano | Infinity | | | | |
| 1 | Lens 1 | −14.628 (ASP) | 0.291 | Plastic | ZEONEX F52R | 1.535 | 1.40 |
| 2 | | −0.715 (ASP) | −0.025 | | | | |
| 3 | Ape. Stop | Plano | 0.386 | | | | |
| 4 | Lens 2 | −0.475 (ASP) | 0.419 | Plastic | ZEONEX F52R | 1.535 | 0.79 |
| 5 | | −0.292 (ASP) | 0.030 | | | | |
| 6 | Lens 3 | 2.023 (ASP) | 0.250 | Plastic | ZEONEX F52R | 1.535 | −1.02 |
| 7 | | 0.412 (ASP) | 0.375 | | | | |
| 8 | Filter | Plano | 0.145 | Glass | HOYA BSC7 | 1.517 | — |
| 9 | | Plano | 0.135 | | | | |
| 10 | Image | Plano | — | | | | |

Note:
Reference wavelength (d-line) is 587.6 nm.

TABLE 8

Aspheric Coefficients

| Surface # | 1 | 2 | 4 | 5 | 6 | 7 |
|---|---|---|---|---|---|---|
| k = | −1.0000E+01 | −1.2027E+01 | −7.7807E−01 | −4.8585E+00 | −1.0000E+00 | −8.3826E+00 |
| A4 = | −1.3284E+00 | −5.0909E+00 | −1.6861E+00 | −8.1769E+00 | 1.0985E+00 | 3.2613E−01 |
| A6 = | −1.1983E+01 | 3.5893E+01 | 6.3991E+01 | 9.0886E+01 | −4.1865E+00 | −8.8940E−01 |
| A8 = | 9.0858E+01 | −2.6115E+02 | −7.6362E+02 | −5.8231E+02 | 2.0378E+00 | −2.4385E−01 |
| A10 = | −5.4701E+02 | 8.1119E+02 | 4.9136E+03 | 2.0318E+03 | 8.2031E+00 | 1.7640E+00 |
| A12 = | 6.9666E+02 | −2.8721E−02 | −1.1593E+04 | −3.3307E+03 | −1.2064E+01 | −1.3145E+00 |
| A14 = | −2.8137E+03 | −6.5156E−05 | −7.7993E−05 | 1.9406E+03 | 4.6499E+00 | 2.3331E−01 |

In the photographing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| f (mm) | 1.17 | (R1 + R2)/(R1 − R2) | 1.10 |
|---|---|---|---|
| Fno | 2.50 | (R5 + R6)/(R5 − R6) | 1.51 |
| HFOV (deg.) | 42.9 | f2/f1 | 0.57 |
| CT1/T12 | 0.81 | |f2/f3| | 0.77 |
| CTmax (mm) | 0.42 | FOV (deg.) | 85.8 |
| f/R1 | −0.08 | |SAG21/CT2| | 0.31 |
| R2/f | −0.61 | | |

5th Embodiment

Figure 9:
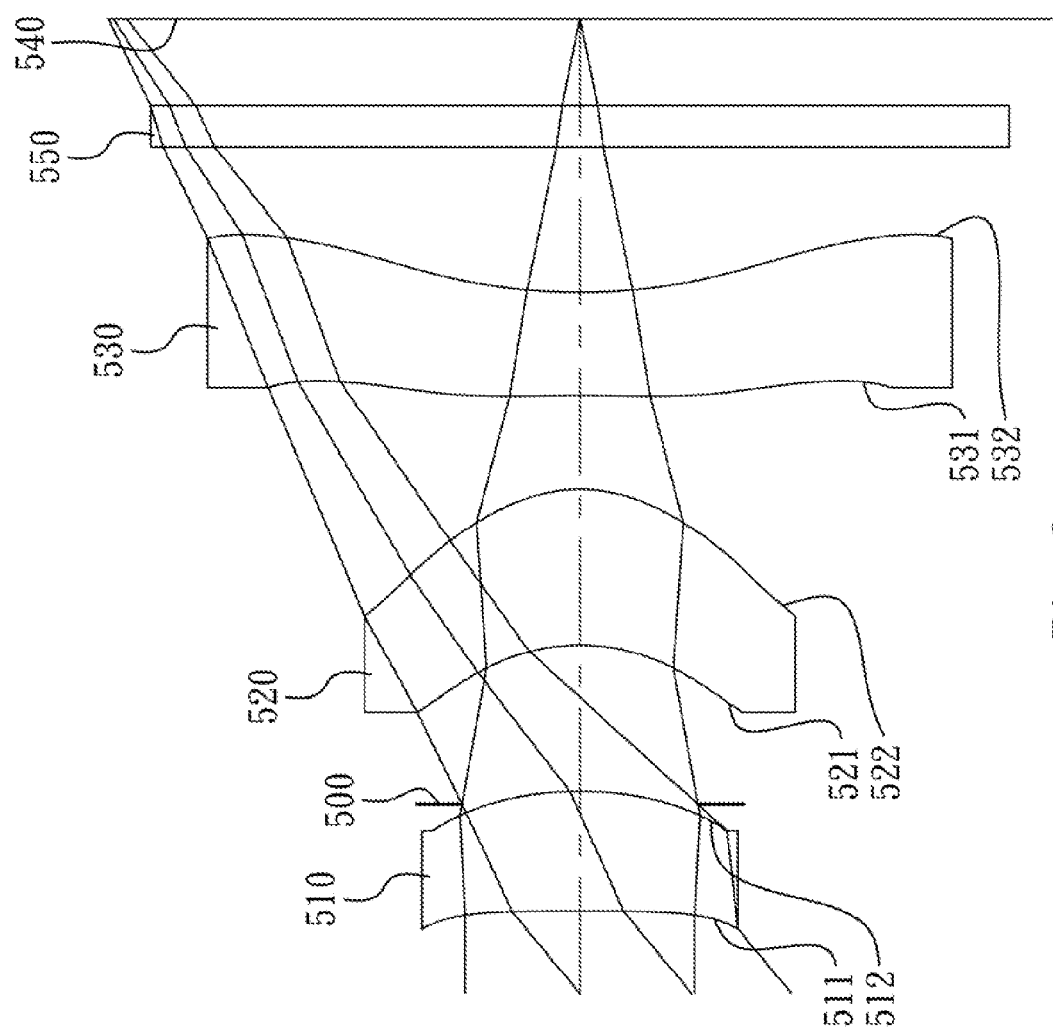
FIG. 9 is a schematic view of a photographing lens assembly according to the 5th embodiment of the present disclosure.
Figure 10:
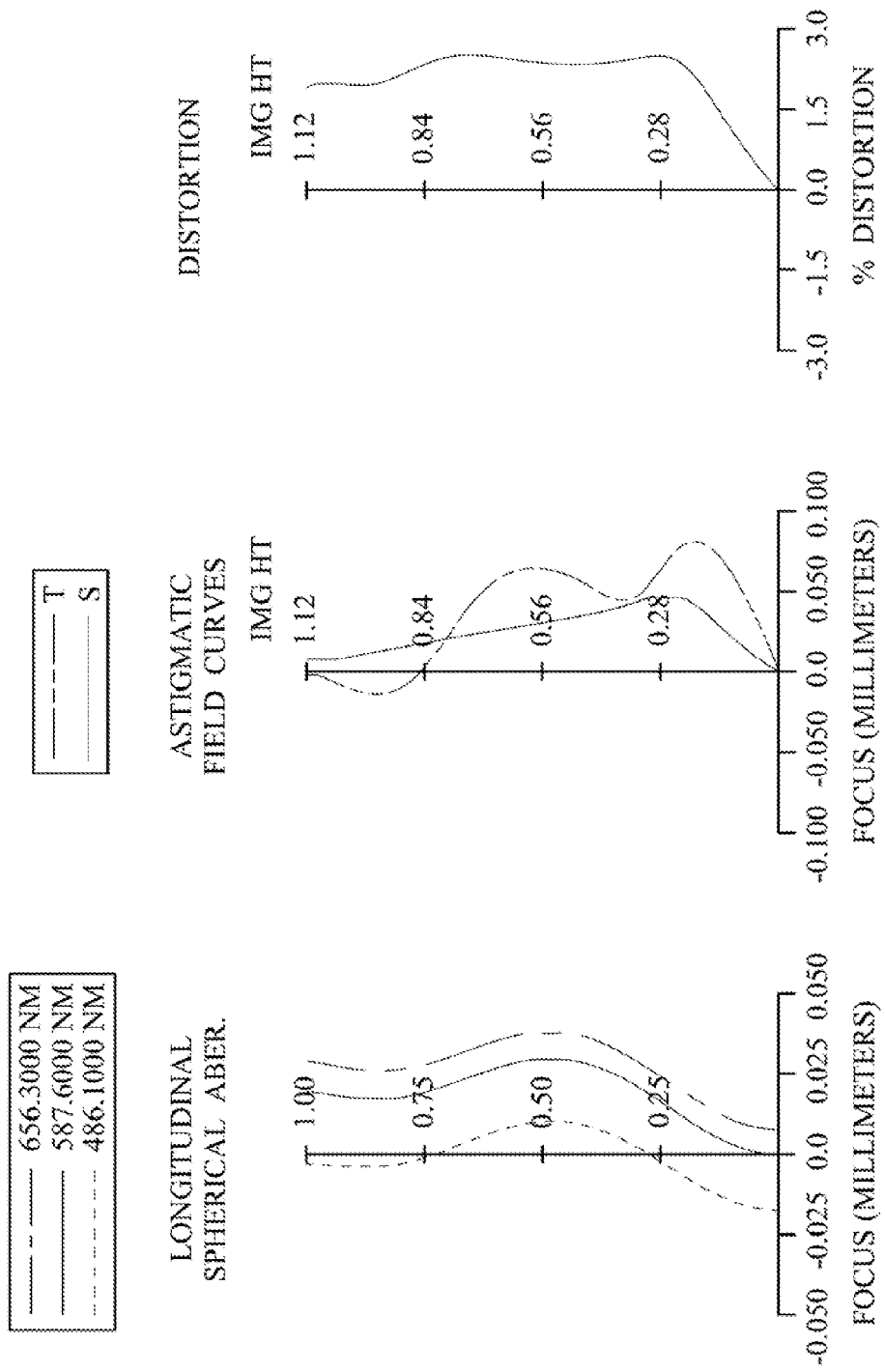
FIG. 10 shows spherical aberration curves, astigmatic field curves and a distortion curve of the photographing lens assembly according to the 5th embodiment.

FIG. 9 is a schematic view of a photographing lens assembly according to the 5th embodiment of the present disclosure. FIG. 10 shows spherical aberration curves, astigmatic field curves and a distortion curve of the photographing lens assembly according to the 5th embodiment. In FIG. 9, the photographing lens assembly includes, in order from an object side to an image side, a first lens element 510 an aperture stop 500, a second lens element 520, a third lens element 530, a filter 550 and an image plane 540.

The first lens element 510 with positive refractive power has an object-side surface 511 being concave at a paraxial region thereof and an image-side surface 512 being convex at a paraxial region thereof. The first lens element 510 is made of plastic material (for example, APEL-5514ML), and has the object-side surface 511 and the image-side surface 512 being aspheric. Moreover, the aperture stop 500 is located closer to the object side of the photographing lens assembly than an axial vertex on the mage-side surface 512 of the first lens element 510.

The second lens element 520 with positive refractive power has an abject-side surface 521 being concave at a paraxial region thereof, and an image-side surface 522 being convex at a paraxial region thereof. The second lens element 520 is made of plastic material (for example, APEL-5514ML) and has the object-side surface 521 and the image-side surface 522 being aspheric.

The third lens element 530 with negative refractive power has an object-side surface 531 being concave at a paraxial region thereof, and an image-side surface 532 being concave at a paraxial region thereof and being convex at a peripheral region thereof. The third lens element 530 is made of plastic material (for example, APEL-5514ML), and has the object-side surface 531 and the image-side surface 532 being aspheric.

The filter 550 made of glass (for example, HOYA BSC7) is located between the third lens element 530 and the image plane 540, and will not affect a focal length of the photographing lens assembly.

The detailed optical data of the 5th embodiment are shown in Table 9 and the aspheric surface data are shown in Table 10 below.

TABLE 9

5th Embodiment
f = 1.32 mm, Fno = 2.40, HFOV = 39.4 deg.

| Surface # | | Curvature Radius | Thickness | Material | Index | Focal length |
|---|---|---|---|---|---|---|
| 0 | Object | Plano | Infinity | | | |
| 1 | Lens 1 | −68.776 (ASP) | 0.288 | Plastic | APEL-5514ML 1.544 | 1.56 |
| 2 | | −0.842 (ASP) | −0.031 | | | |
| 3 | Ape. Stop | Plano | 0.382 | | | |
| 4 | Lens 2 | −0.475 (ASP) | 0.375 | Plastic | APEL-5514ML 1.544 | 1.25 |
| 5 | | −0.358 (ASP) | 0.225 | | | |
| 6 | Lens 3 | −3.795 (ASP) | 0.247 | Plastic | APEL-5514ML 1.544 | −1.84 |
| 7 | | 1.389 (ASP) | 0.350 | | | |
| 8 | Filter | Plano | 0.100 | Glass | HOYA BSC7 1.517 | — |
| 9 | | Plano | 0.208 | | | |
| 10 | Image | Plano | — | | | |

Note:
Reference wavelength (d-line) is 587.6 nm.

TABLE 10

Aspheric Coefficients

| Surface # | 1 | 2 | 4 | 5 | 6 | 7 |
|---|---|---|---|---|---|---|
| k = | −1.0000E+01 | −9.1121E+00 | −7.0855E−01 | −5.6532E+00 | −7.1100E+00 | −1.0000E+01 |
| A4 = | −1.1316E+00 | −3.0955E+00 | −2.0424E+00 | −8.8102E+00 | 2.4874E+00 | 6.5950E−01 |
| A6 = | −6.3728E+00 | 1.2342E+01 | 4.6567E+01 | 8.8615E+01 | −9.0645E+00 | −2.0315E+00 |
| A8 = | 1.1482E+01 | −6.6525E+01 | −6.2776E+02 | −5.7702E+02 | 1.3035E+01 | 6.2673E−01 |
| A10 = | 3.8387E+01 | 1.2862E+02 | 4.5617E+03 | 2.0622E+03 | −4.7699E+00 | 3.9232E+00 |
| A12 = | −3.3228E+02 | −3.9008E−05 | −1.1593E+04 | −3.3720E+03 | −5.0573E+00 | −5.3270E+00 |
| A14 = | −2.8137E+03 | −8.1119E−05 | 3.3321E−04 | 1.7243E+03 | 2.1744E+00 | 2.0072E+00 |

In the photographing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| f (mm) | 1.32 | (R1 + R2)/(R1 − R2) | 1.02 |
|---|---|---|---|
| Fno | 2.40 | (R5 + R6)/(R5 − R6) | 0.46 |
| HFOV (deg.) | 39.4 | f2/f1 | 0.80 |
| CT1/T12 | 0.82 | |f2/f3| | 0.68 |
| CTmax (mm) | 0.38 | FOV (deg.) | 78.8 |
| f/R1 | −0.02 | |SAG21/CT2| | 0.43 |
| R2/f | −0.64 | | |

6th Embodiment

Figure 11:
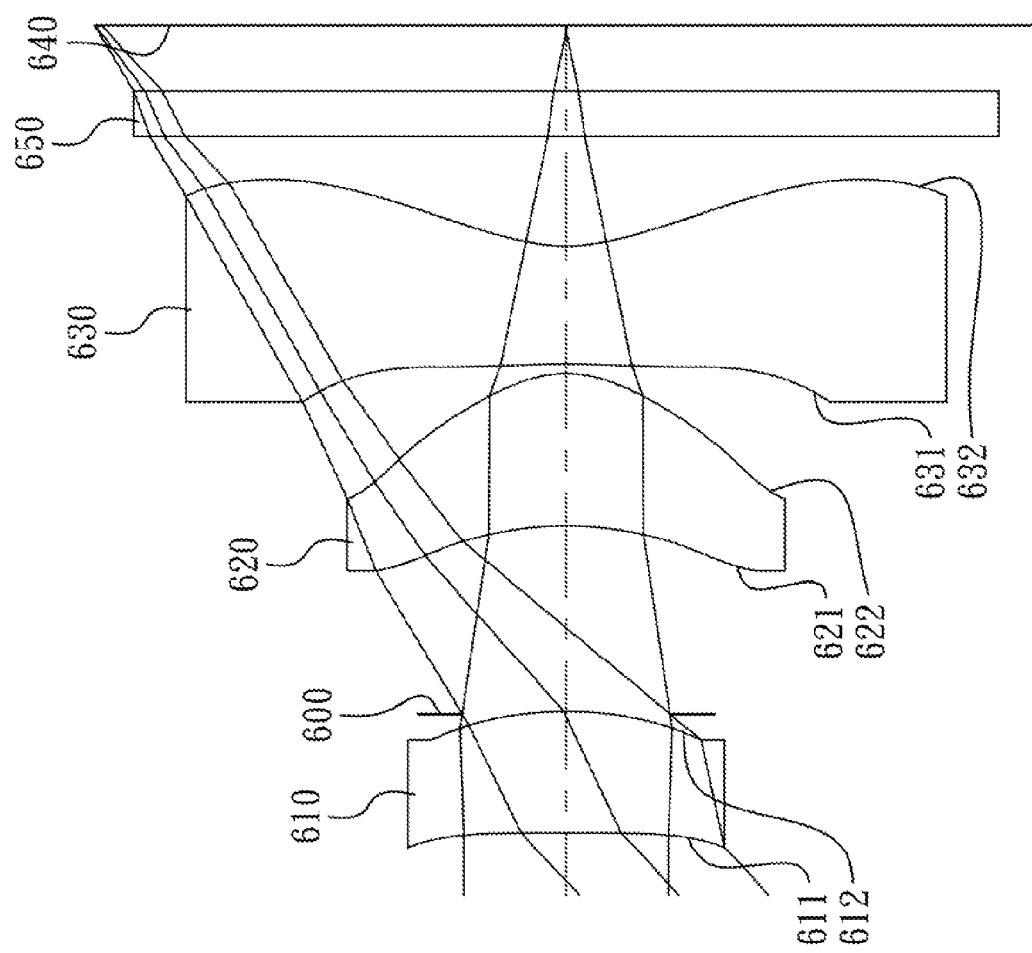
FIG. 11 is a schematic view of a photographing lens assembly according to the 6th embodiment of the present disclosure.
Figure 12:
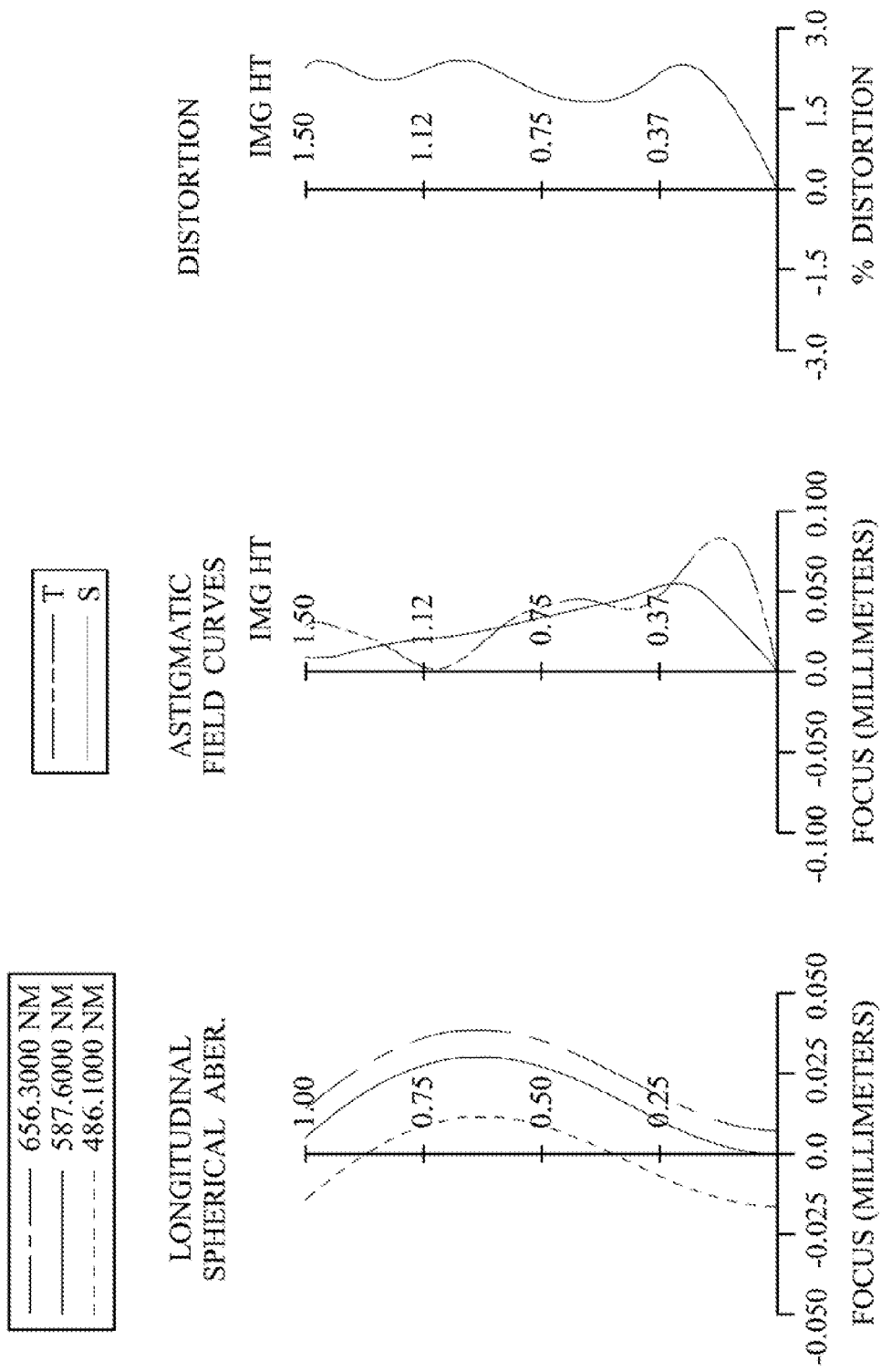
FIG. 12 shows spherical aberration curves, astigmatic field curves and a distortion curve of the photographing lens assembly according to the 6th embodiment.

FIG. 11 is a schematic view of a photographing lens assembly according to the 6th embodiment of the present disclosure. FIG. 12 shows spherical aberration curves, astigmatic field curves and a distortion curve of the photographing lens assembly according to the 6th embodiment. In FIG. 11, the photographing lens assembly includes, in order from an object side to an image side, a first lens element 610 an aperture stop 600, a second lens element 620, a third lens element 630, a filter 650 and an image plane 640.

The first lens element 610 with positive refractive power has an object-side surface 611 being concave at a paraxial region thereof and an image-side surface 612 being convex at a paraxial region thereof. The first lens element 610 is made of glass material (for example, SUMITA KPSK11), and has the object-side surface 611 and the image-side surface 612 being aspheric. Moreover, the aperture stop 600 is located closer to the object side of the photographing lens assembly than an axial vertex on the image-side surface 612 of the first lens element 610.

The second lens element 620 with positive refractive power has an object-side surface 621 being concave at a paraxial region thereof, and an image-side surface 622 being convex at a paraxial region thereof. The second lens element 620 is made of glass material (for example, SUMITA KPSK11), and has the object-side surface 621 and the image-side surface 622 being aspheric.

The third lens element 630 with negative refractive power has an object-side surface 631 being concave at a paraxial region thereof, and an image-side surface 632 being concave at a paraxial region thereof and being convex at a peripheral region thereof. The third lens element 630 is made of glass material (for example, SUMITA KPSK11) and has the object-side surface 631 and the image-side surface 632 being aspheric.

The filter 650 made of glass (for example, HOYA BSC7) is located between the third lens element 630 and the image plane 640, and not affect a focal length of the photographing lens assembly.

The detailed optical data of the 6th embodiment are shown in Table 11 and the aspheric surface data are shown in Table 12 below.

TABLE 11

6th Embodiment
f = 1.57 mm, Fno = 2.40, HFOV = 42.8 deg.

| Surface # | | Curvature Radius | Thickness | Material | | Index | Focal length |
|---|---|---|---|---|---|---|---|
| 0 | Object | Plano | Infinity | | | | |
| 1 | Lens 1 | −43.054 (ASP) | 0.387 | Glass | SUMITA KPSK11 | 1.566 | 2.16 |
| 2 | | −1.194 (ASP) | −0.009 | | | | |
| 3 | Ape. Stop | Plano | 0.601 | | | | |
| 4 | Lens 2 | −1.128 (ASP) | 0.486 | Glass | SUMITA KPSK11 | 1.566 | 0.75 |
| 5 | | −0.355 (ASP) | 0.030 | | | | |
| 6 | Lens 3 | −2.896 (ASP) | 0.376 | Glass | SUMITA KPSK11 | 1.566 | −0.74 |
| 7 | | 0.515 (ASP) | 0.350 | | | | |
| 8 | Filter | Plano | 0.145 | Glass | HOYA BSC7 | 1.517 | — |
| 9 | | Plano | 0.209 | | | | |
| 10 | Image | Plano | — | | | | |

Note:
Reference wavelength (d-line) is 587.6 nm.

TABLE 12

Aspheric Coefficients

| Surface # | 1 | 2 | 4 | 5 | 6 | 7 |
|---|---|---|---|---|---|---|
| k = | −1.0000E+01 | −1.0000E+01 | −1.1112E+00 | −4.2633E+00 | −7.2661E+00 | −8.0949E+00 |
| A4 = | −4.5369E−01 | −1.1457E+00 | −9.7468E−01 | −2.8931E+00 | 1.1756E+00 | −2.5990E−02 |
| A6 = | −1.4596E+00 | 3.2322E+00 | 1.2592E+01 | 1.9512E+01 | −3.4138E+00 | −1.0060E−01 |
| A8 = | 5.1003E+00 | −1.1908E+01 | −8.6804E+01 | −7.6580E+01 | 2.3280E+00 | −6.0177E−02 |
| A10 = | −1.1651E+01 | 2.0918E+01 | 3.1034E+02 | 1.4988E+02 | 8.5334E−01 | 1.4326E−01 |
| A12 = | 5.5715E+00 | −1.2640E+01 | −5.1144E+02 | −1.2837E+02 | −1.3957E−01 | −6.3392E−02 |
| A14 = | −1.9519E+01 | −5.7990E−06 | 3.1723E+02 | 3.6910E+01 | −1.2313E+00 | 5.5351E−03 | in the photographing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| f (mm) | 1.57 | (R1 + R2)/(R1 − R2) | 1.06 |
|---|---|---|---|
| Fno | 2.40 | (R5 + R6)/(R5 − R6) | 0.70 |
| HFOV (deg.) | 42.8 | f2/f1 | 0.34 |
| CT1/T12 | 0.65 | |f2/f3| | 1.00 |
| CTmax (mm) | 0.49 | FOV (deg.) | 85.6 |
| f/R1 | −0.04 | |SAG21/CT2| | 0.30 |
| R2/f | −0.76 | | |

7th Embodiment

Figure 13:
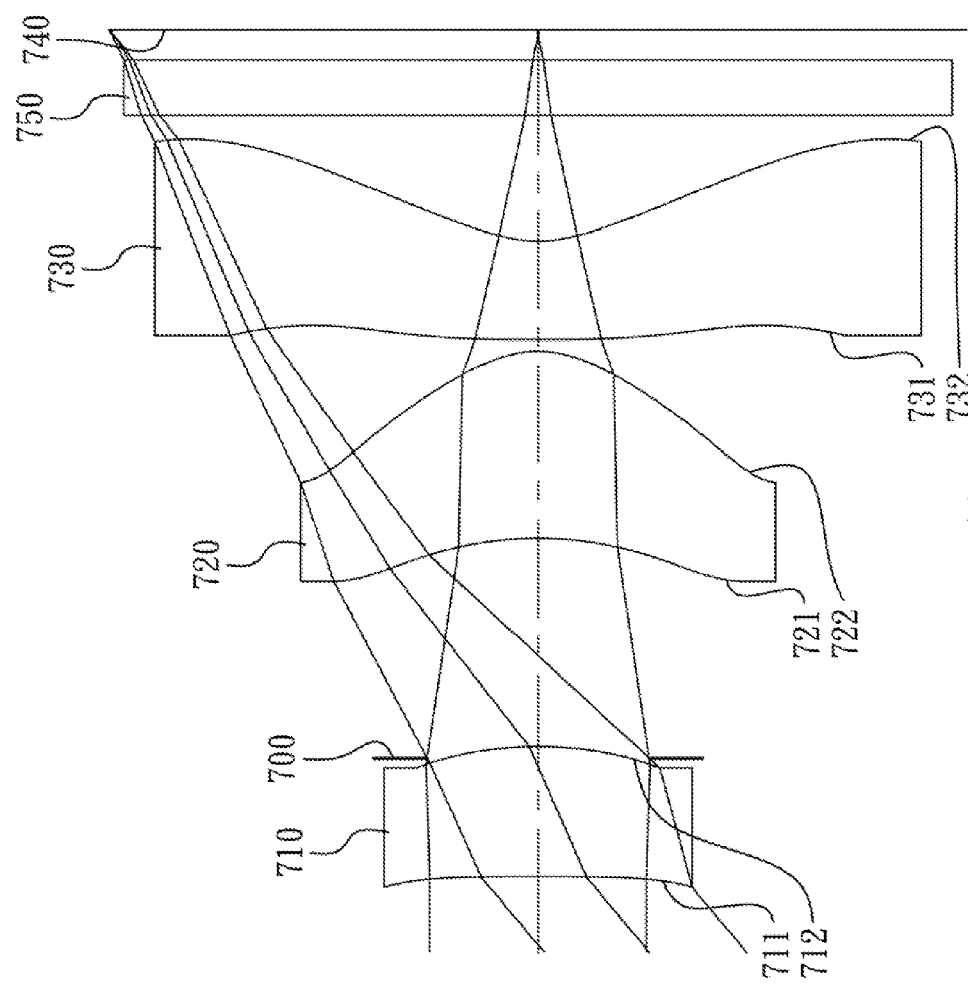
FIG. 13 is a schematic view of a photographing lens assembly according to the 7th embodiment of the present disclosure.
Figure 14:
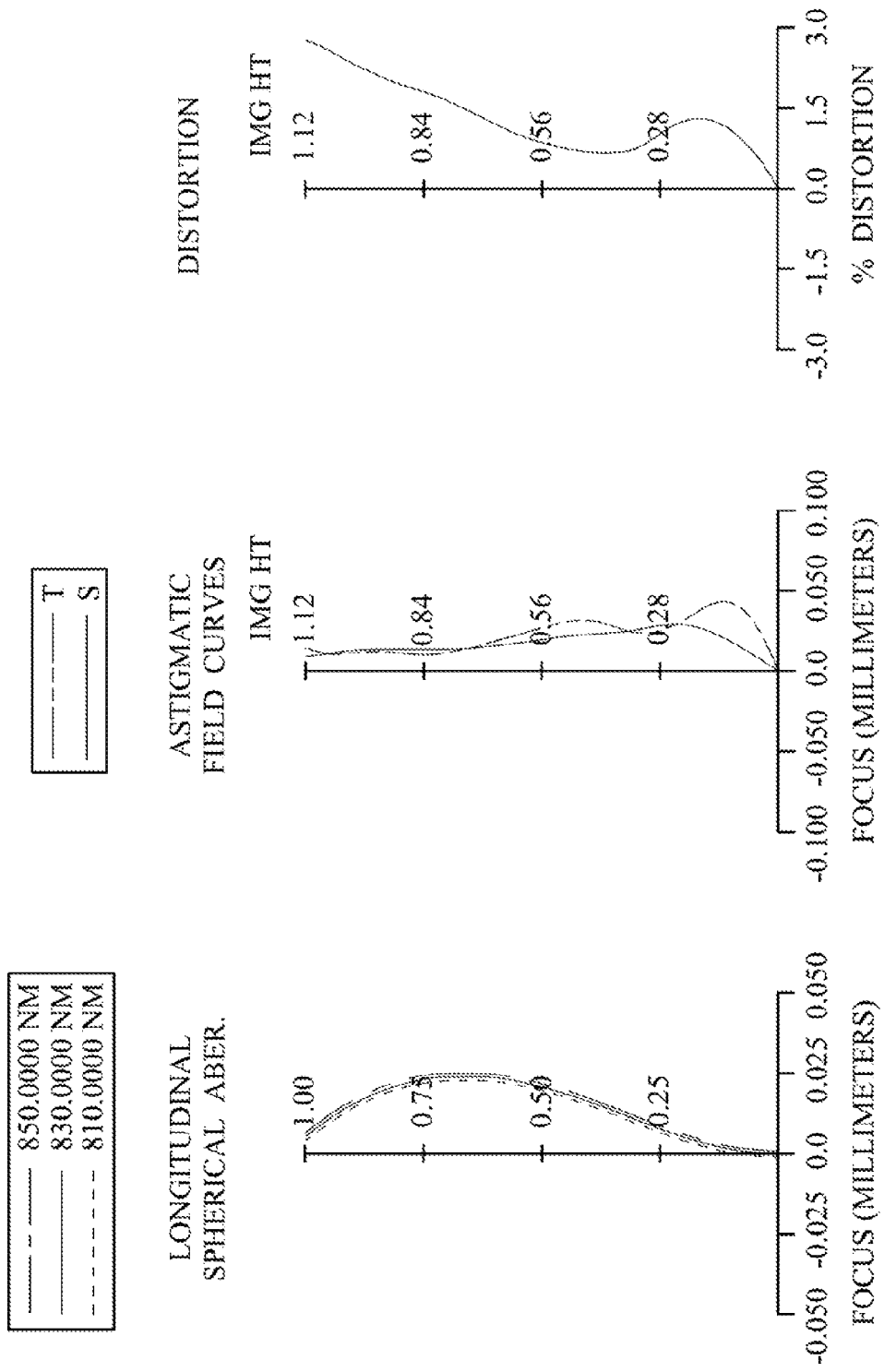
FIG. 14 shows spherical aberration curves, astigmatic field curves and a distortion curve of the photographing lens assembly according to the 7th embodiment.

FIG. 13 is a schematic view of a photographing lens assembly according to the 7th embodiment of the present disclosure. FIG. 14 shows spherical aberration curves, astigmatic field curves and a distortion curve of the photographing lens assembly according to the 7th embodiment. In FIG. 13, the photographing lens assembly includes, in order from an object side to an image side, a first lens element 710, an aperture stop 700, a second lens element 720, a third lens element 730, a filter 750 and an image plane 740.

The first lens element 710 with positive refractive power has an object-side surface 711 being concave at a paraxial region thereof and an image-side surface 712 being convex at a paraxial region thereof. The first lens element 710 is made of plastic material (for example, PC), and has the object-side surface 711 and the image-side surface 712 being aspheric. Moreover, the aperture stop 700 is located closer to the object side of the photographing lens assembly than an axial vertex on the image-side surface 712 of the first lens element 710.

The second lens element 720 with positive refractive power has an object-side surface 721 being concave at a paraxial region thereof, and an image-side surface 722 being convex at a paraxial region thereof. The second lens element 720 is made of plastic material (for example, ARTON-D4532), and has the object-side surface 721 and the image-side surface 722 being aspheric.

The third lens element 730 with negative refractive power has an object-side surface 731 being convex at a paraxial region thereof, and an image-side surface 732 being concave at a paraxial region thereof and being convex at a peripheral region thereof. The third lens element 730 is made of plastic material (for example, PC), and has the object-side surface 731 and the image-side surface 732 being aspheric.

The filter 750 made of glass (for example, HOYA BSC7) is located between the third lens element 730 and the image plane 740, and will not affect a focal length of the photographing lens assembly.

The detailed optical data of the 7th embodiment shown in Table 13 and the aspheric surface data shown in Table 14 below can be applied to the infrared wavelength range of 780 nm~950 nm.

TABLE 13

7th Embodiment
f = 1.30 mm, Fno = 2.30, HFOV = 39.6 deg.

| Surface # | | Curvature Radius | Thickness | Material | | Index | Focal length |
|---|---|---|---|---|---|---|---|
| 0 | Object | Plano | Infinity | | | | |
| 1 | Lens 1 | −33.763 (ASP) | 0.340 | Plastic | PC | 1.569 | 1.83 |
| 2 | | −1.017 (ASP) | −0.030 | | | | |
| 3 | Ape. Stop | Plano | 0.574 | | | | |
| 4 | Lens 2 | −0.984 (ASP) | 0.491 | Plastic | ARTON-D4532 | 1.507 | 0.59 |
| 5 | | −0.268 (ASP) | 0.030 | | | | |
| 6 | Lens 3 | 13.335 (ASP) | 0.258 | Plastic | PC | 1.569 | −0.58 |
| 7 | | 0.319 (ASP) | 0.330 | | | | |
| 8 | Filter | Plano | 0.145 | Glass | HOYA BSC7 | 1.510 | — |
| 9 | | Plano | 0.078 | | | | |
| 10 | Image | Plano | — | | | | |

Note:
The photographing lens assembly is applicable to the infrared wavelength range and reference wavelength is 830 nm.

TABLE 14

Aspheric Coefficients

| Surface # | 1 | 2 | 4 | 5 | 6 | 7 |
|---|---|---|---|---|---|---|
| k = | −1.0000E+00 | −1.6794E+01 | −5.5895E−01 | −3.8233E+00 | −1.0000E+00 | −6.6847E+00 |
| A4 = | −7.3925E−01 | −2.4167E+00 | −1.0406E+00 | −3.8162E+00 | 1.1126E+00 | 2.7011E−01 |
| A6 = | −1.7949E+00 | 1.2058E+01 | 1.6954E+01 | 3.0920E+01 | −3.8736E+00 | −1.1327E+00 |
| A8 = | 6.5807E+00 | −6.2815E+01 | −1.3895E+02 | −1.4889E+02 | 2.7852E+00 | 1.4537E+00 |
| A10 = | −2.3506E+01 | 1.5665E+02 | 6.8703E+02 | 3.8511E+02 | 4.6104E+00 | −9.9568E−01 |
| A12 = | −4.4122E+01 | −1.0581E+01 | −1.6089E+03 | −4.5553E+02 | −8.4617E+00 | 3.7444E−01 |
| A14 = | 1.3851E+02 | −4.2333E+02 | 1.4237E+03 | 1.9221E+02 | 3.7707E+00 | −7.5837E−02 |

In the photographing lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| f (mm) | 1.30 | (R1 + R2)/(R1 − R2) | 1.06 |
|---|---|---|---|
| Fno | 2.30 | (R5 + R6)/(R5 − R6) | 1.05 |
| HFOV (deg.) | 39.6 | f2/f1 | 0.32 |
| CT1/T12 | 0.63 | |f2/f3| | 1.02 |
| CTmax (mm) | 0.49 | FOV (deg.) | 79.2 |
| f/R1 | −0.04 | |SAG21/CT2| | 0.23 |
| R2/f | −0.78 | | |

8th Embodiment

Figure 15:
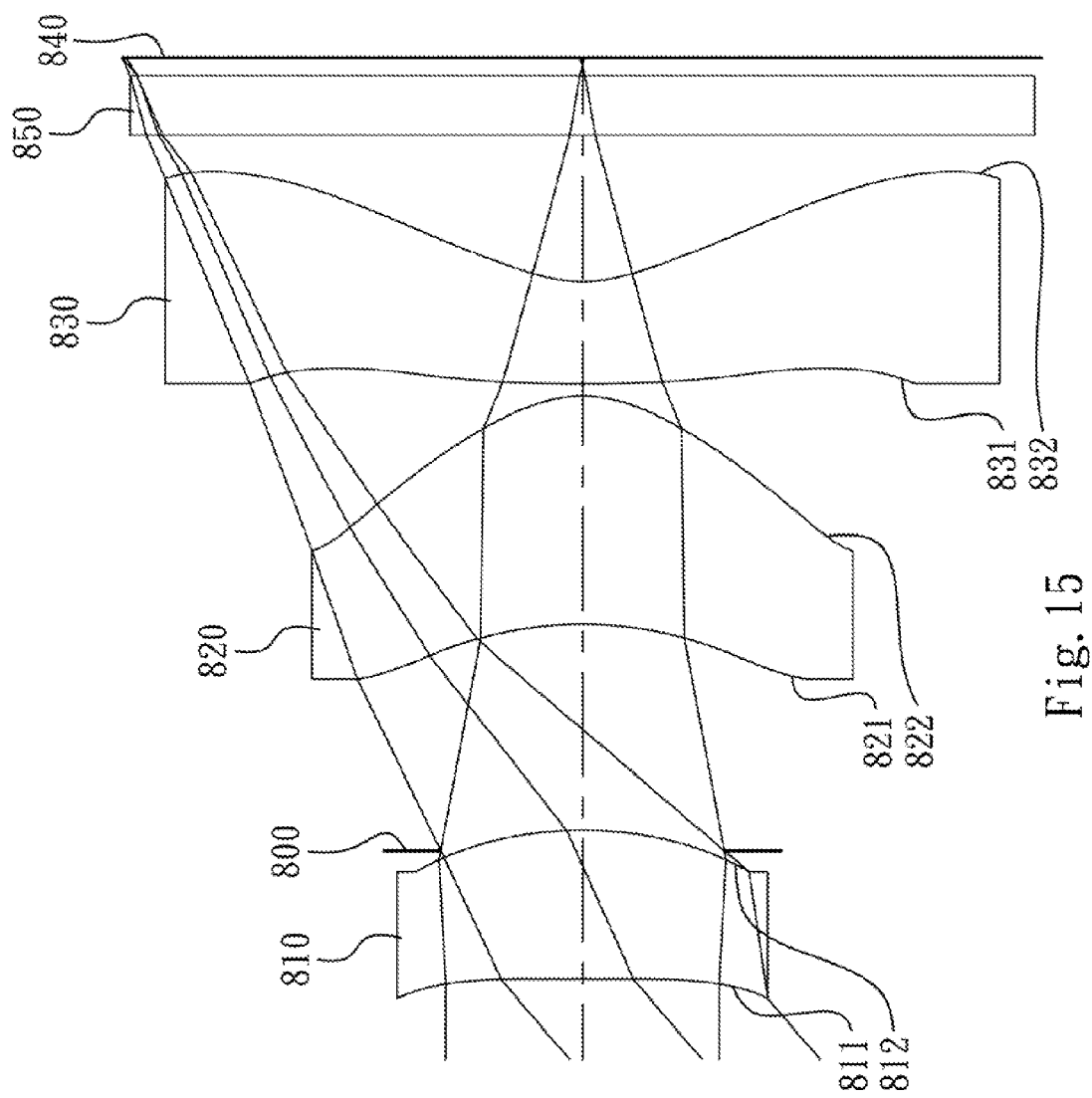
FIG. 15 is a schematic view of a photographing lens assembly according to the 8th embodiment of the present disclosure.
Figure 16:
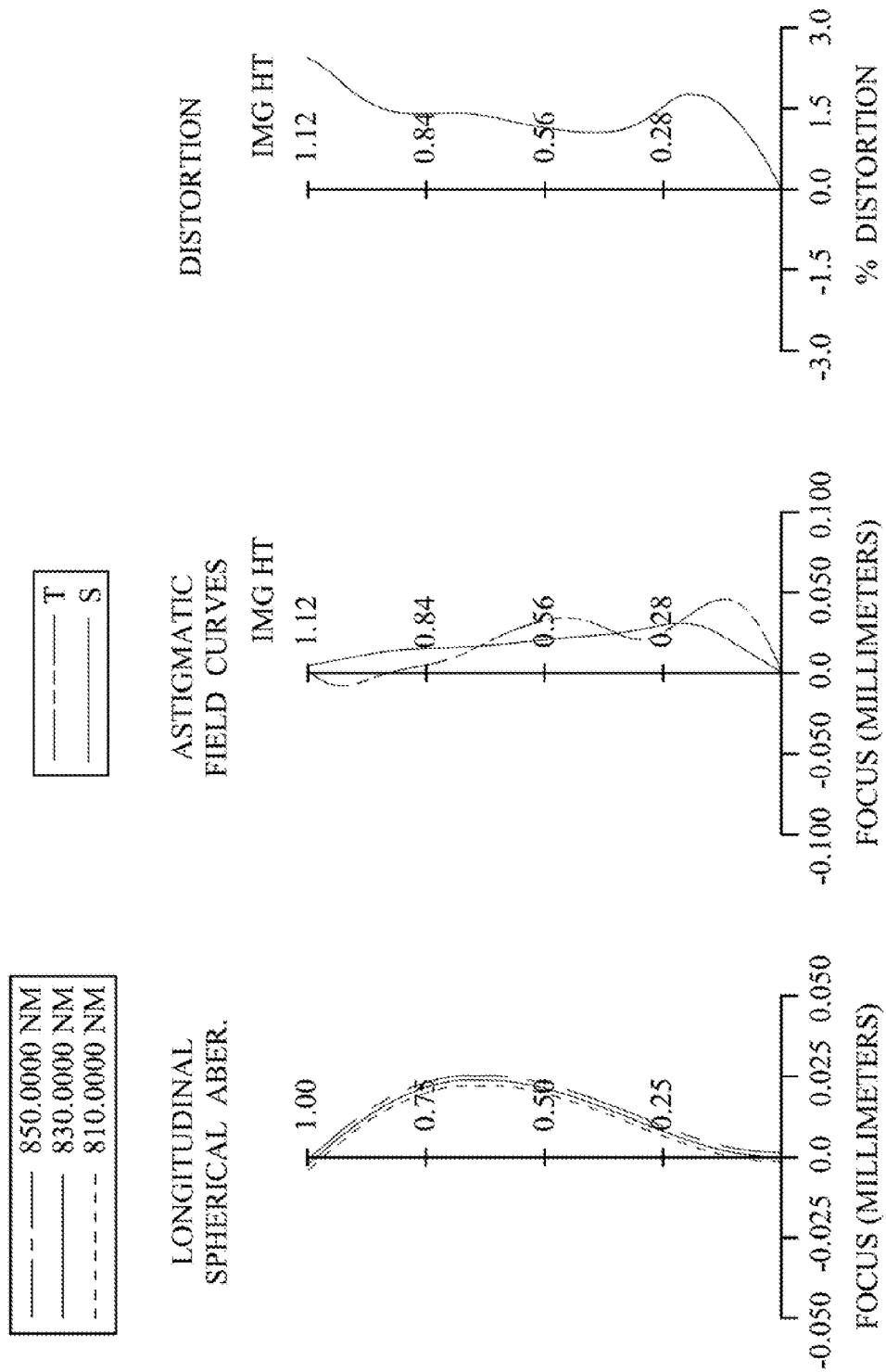
FIG. 16 shows spherical aberration curves, astigmatic field curves and a distortion curve of the photographing lens assembly according to the 8th embodiment.

FIG. 15 is a schematic view of a photographing lens assembly according to the 8th embodiment of the present disclosure. FIG. 16 shows spherical aberration curves, astigmatic field curves and a distortion curve of the photographing lens assembly according to the 8th embodiment. In FIG. 15, the photographing lens assembly includes, in order from an object side to an image side, a first lens element 810, an aperture stop 800, a second lens element 820, a third lens element 830, a filter 850 and an image plane 840.

The first lens element 810 with positive refractive power has an object-side surface 811 being concave at a paraxial region thereof and an image-side surface 812 being convex at a paraxial region thereof. The first lens element 810 is made of plastic material (for example, PC), and has the object-side surface 811 and the image-side surface 812 being aspheric. Moreover, the aperture stop 800 is located closer to the object side of the photographing lens assembly than an axial vertex on the image-side surface 812 of the first lens element 810.

The second lens element 820 with positive refractive power has an object-side surface 821 being concave at a paraxial region thereof and an image-side surface 822 being convex at a paraxial region thereof. The second lens element 820 is made of plastic material (for example, PC), and has the object-side surface 821 and the image-side surface 822 being aspheric.

The third lens element 830 with negative refractive power has an object-side surface 831 being convex at a paraxial region thereof, and an image-side surface 832 being concave at a paraxial region thereof and being convex at a peripheral region thereof. The third lens element 830 is made of plastic material (for example, PC), and has the object-side surface 831 and the image-side surface 832 being aspheric.

The filter 850 made of glass (for example, HOYA BSC7) is located between the third lens element 830 and the image plane 840, and not affect a focal length of the photographing lens assembly.

The detailed optical data of the 8th embodiment shown in Table 15 and the aspheric surface data shown in Table 16 below can be applied to the infrared wavelength range of 780 nm~950 nm.

TABLE 15

8th Embodiment
f = 1.28 mm, Fno = 1.90, HFOV = 40.3 deg.

| Surface # | | Curvature Radius | Thickness | Material | Index | Focal length |
|---|---|---|---|---|---|---|
| 0 | Object | Plano | Infinity | | | |
| 1 | Lens 1 | −84.507 (ASP) | 0.365 | Plastic | PC 1.569 | 1.74 |
| 2 | | −0.979 (ASP) | −0.050 | | | |
| 3 | Ape. Stop | Plano | 0.555 | | | |
| 4 | Lens 2 | −0.970 (ASP) | 0.561 | Plastic | PC 1.569 | 0.59 |
| 5 | | −0.302 (ASP) | 0.030 | | | |
| 6 | Lens 3 | 5.288 (ASP) | 0.251 | Plastic | PC 1.569 | −0.61 |
| 7 | | 0.322 (ASP) | 0.361 | | | |
| 8 | Filter | Plano | 0.145 | Glass | HOYA BSC7 1.510 | — |
| 9 | | Plano | 0.045 | | | |
| 10 | Image | Plano | — | | | |

Note:
The photographing lens assembly is applicable to the infrared wavelength range and reference wavelength is 830 nm.

TABLE 16

Aspheric Coefficients

| Surface # | 1 | 2 | 4 | 5 | 6 | 7 |
|---|---|---|---|---|---|---|
| k = | −1.0000E+00 | −1.2061E+01 | 5.6508E−01 | −4.1812E+00 | −4.5159E+01 | −6.1016E+00 |
| A4 = | −6.9525E−01 | −2.0408E+00 | −6.0941E−01 | −3.0268E+00 | 6.6559E−01 | 1.9156E−01 |
| A6 = | −2.5501E+00 | 7.5339E+00 | 9.7480E+00 | 1.9400E+01 | −2.1292E+00 | −8.3873E−01 |
| A8 = | 1.1149E+01 | −3.1913E+01 | −6.7159E+01 | −7.7840E+01 | 5.6482E−01 | 8.7696E−01 |
| A10 = | −3.7250E+01 | 6.4099E+01 | 2.9981E+02 | 1.7056E+02 | 3.0124E+00 | −4.6341E−01 |
| A12 = | −1.6583E+01 | −3.9793E+00 | −6.0583E+02 | −1.7343E+02 | −2.3275E+00 | 1.8290E−01 |
| A14 = | 4.3610E+01 | −1.3329E+02 | 4.4237E+02 | 6.4564E+01 | −3.5199E−01 | −7.1498E−02 |

In the photographing lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| f (mm) | 1.28 | (R1 + R2)/(R1 − R2) | 1.02 |
|---|---|---|---|
| Fno | 1.90 | (R5 + R6)/(R5 − R6) | 1.13 |
| HFOV (deg.) | 40.3 | f2/f1 | 0.34 |
| CT1/T12 | 0.72 | |f2/f3| | 0.97 |
| CTmax (mm) | 0.56 | FOV (deg.) | 80.6 |
| f/R1 | −0.02 | |SAG21/CT2| | 0.24 |
| R2/f | −0.76 | | |

9th Embodiment

Figure 17:
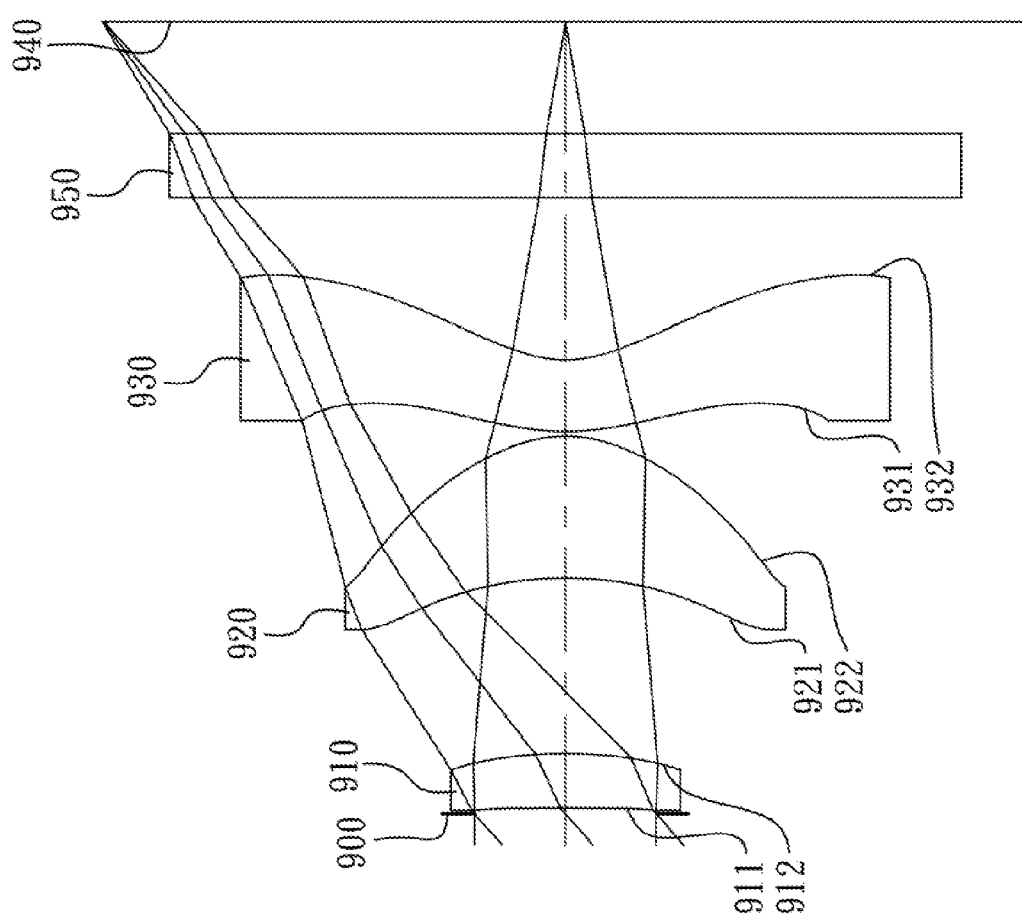
FIG. 17 is a schematic view of a photographing lens assembly according to the 9th embodiment of the present disclosure.
Figure 18:
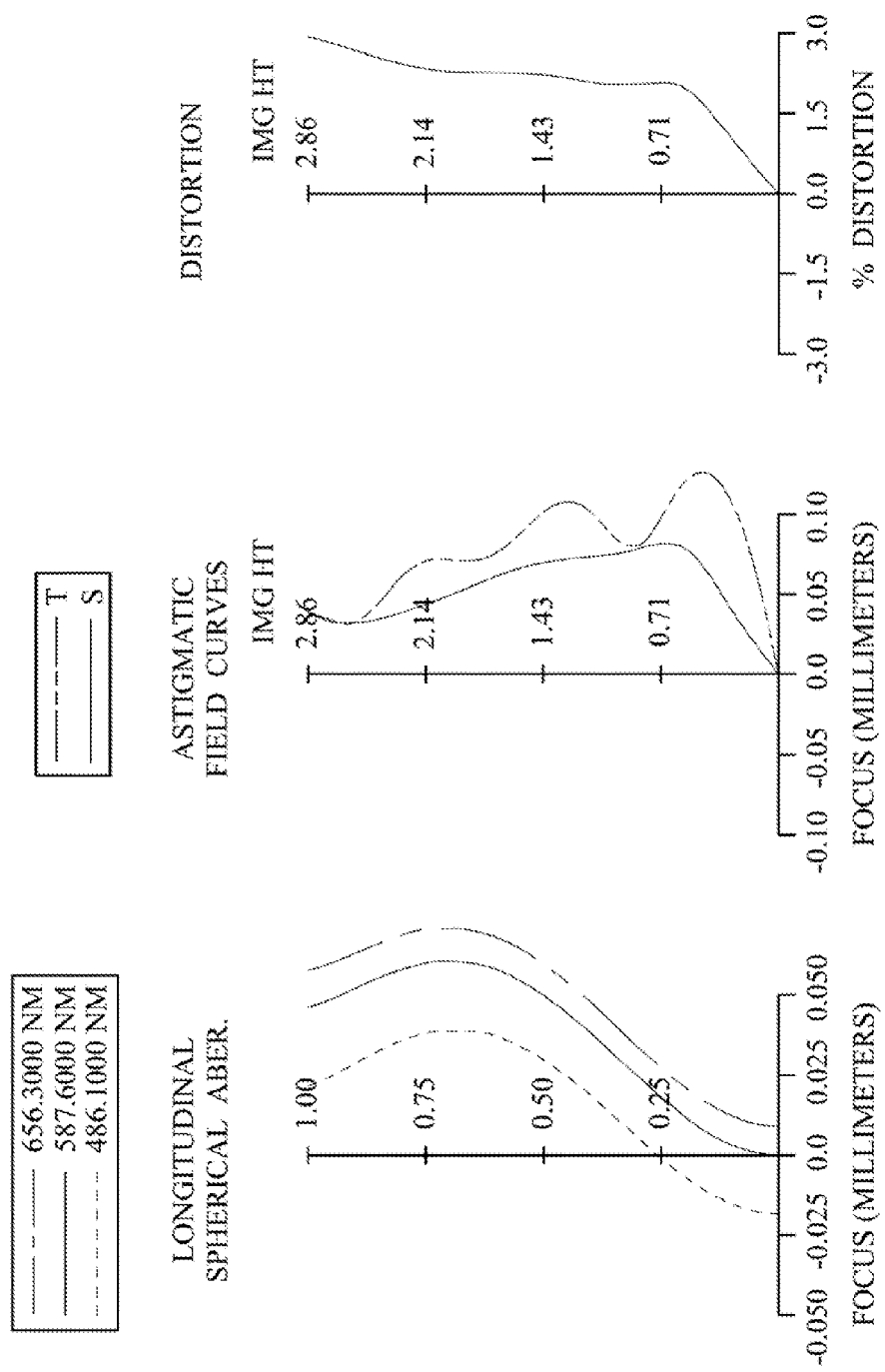
FIG. 18 shows spherical aberration curves, astigmatic field curves and a distortion curve of the photographing lens assembly according to the 9th embodiment.

FIG. 17 is a schematic view of a photographing lens assembly according to the 9th embodiment of the present disclosure. FIG. 18 shows spherical aberration curves, astigmatic field curves and a distortion curve of the photographing lens assembly according to the 9th embodiment. In FIG. 17, the photographing lens assembly includes, in order from an object side to an image side, an aperture stop 900, a first lens element 910, a second lens element 920, a third lens element 930, a filter 950 and an image plane 940.

The first lens element 910 with positive refractive power has an object-side surface 911 being concave at a paraxial region thereof and an image-side surface 912 being convex at a paraxial region thereof. The first lens element 910 is made of glass material (for example, SUMITA KPG375), and has the object-side surface 911 and the image-side surface 912 being aspheric. Moreover, the aperture stop 900 is located closer to the object side of the photographing lens assembly than an axial vertex on the image-side surface 912 of the first lens element 910.

The second lens element 920 with positive refractive power has an object-side surface 921 being concave at a paraxial region thereof, and an image-side surface 922 being convex at a paraxial region thereof. The second lens element 920 is made of plastic material (for example, ARTON-D4532), and has the object-side surface 921 and the image-side surface 922 being aspheric.

The third lens element 930 with negative refractive power has an object-side surface 931 being convex at a paraxial region thereof, and an image-side surface 932 being concave at a paraxial region thereof and being convex at a peripheral region thereof. The third lens element 930 is made of plastic material (for example, MGC EP5000), and has the object-side surface 931 and the image-side surface 932 being aspheric.

The filter 950 made of glass (for example, HOYA BSC7) is located between the third lens element 930 and the image plane 940, and will not affect a focal length of the photographing lens assembly.

The detailed optical data of the 9th embodiment are shown in Table 17 and the aspheric surface data are shown in Table 18 below.

TABLE 17

9th Embodiment
f = 3.20 mm, Fno = 2.85, HFOV = 40.5 deg.

| Surface # | | Curvature Radius | Thickness | Material | Index | Focal length |
|---|---|---|---|---|---|---|
| 0 | Object | Plano | Infinity | | | |
| 1 | Lens 1 | −62.996 (ASP) | 0.365 | Glass | SUMITA KPG375 1.542 | 6.17 |
| 2 | | −3.185 (ASP) | 0.336 | | | |
| 3 | Ape. Stop | Plano | 1.087 | | | |
| 4 | Lens 2 | −2.303 (ASP) | 0.875 | Plastic | ARTON-D4532 1.514 | 2.02 |
| 5 | | −0.808 (ASP) | 0.030 | | | |
| 6 | Lens 3 | 1.614 (ASP) | 0.446 | Plastic | MGC EP5000 1.634 | −2.57 |
| 7 | | 0.723 (ASP) | 1.000 | | | |
| 8 | Filter | Plano | 0.400 | Glass | HOYA BSC7 1.517 | — |
| 9 | | Plano | 0.692 | | | |
| 10 | Image | Plano | — | | | |

Note:
Reference wavelength (d-line) is 587.6 nm.

TABLE 18

Aspheric Coefficients

| Surface # | 2 | 3 | 4 | 5 | 6 | 7 |
|---|---|---|---|---|---|---|
| k = | 1.2000E+02 | −2.1577E+00 | 4.8202E−01 | −4.1977E+00 | −1.0000E+00 | −3.7288E+00 |
| A4 = | −9.4902E−02 | −8.4265E−02 | −9.9188E−04 | −2.8689E−01 | −2.0200E−01 | −6.0357E−02 |
| A6 = | −4.4477E−02 | −2.4677E−02 | 2.0713E−02 | 2.5912E−01 | 7.6414E−02 | 1.5180E−02 |
| A8 = | 3.1714E−02 | 8.4470E−02 | −1.1990E−01 | −2.1182E−01 | −2.3361E−02 | −2.6713E−03 |
| A10 = | −3.3379E−03 | −1.6250E−01 | 1.4568E−01 | 9.6576E−02 | 2.6024E−03 | 3.5013E−04 |
| A12 = | −2.4364E−02 | 2.4212E−01 | −5.5143E−02 | −2.4251E−02 | 9.0589E−04 | −5.0609E−05 |
| A14 = | 3.2433E−03 | −1.1714E−01 | 6.7633E−03 | 4.3061E−03 | −2.8268E−04 | 3.7007E−06 |

In the photographing lens assembly according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following relationships:

| f (mm) | 3.20 | (R1 + R2)/(R1 − R2) | 1.11 |
|---|---|---|---|
| Fno | 2.85 | (R5 + R6)/(R5 − R6) | 2.62 |
| HFOV (deg.) | 40.5 | f2/f1 | 0.33 |
| CT1/T12 | 0.31 | \|f2/f3\| | 0.79 |
| CTmax (mm) | 0.88 | FOV (deg.) | 81.0 |
| f/R1 | −0.05 | \|SAG21/CT2\| | 0.36 |
| R2/f | −1.00 | | |

10th Embodiment

Figure 19:
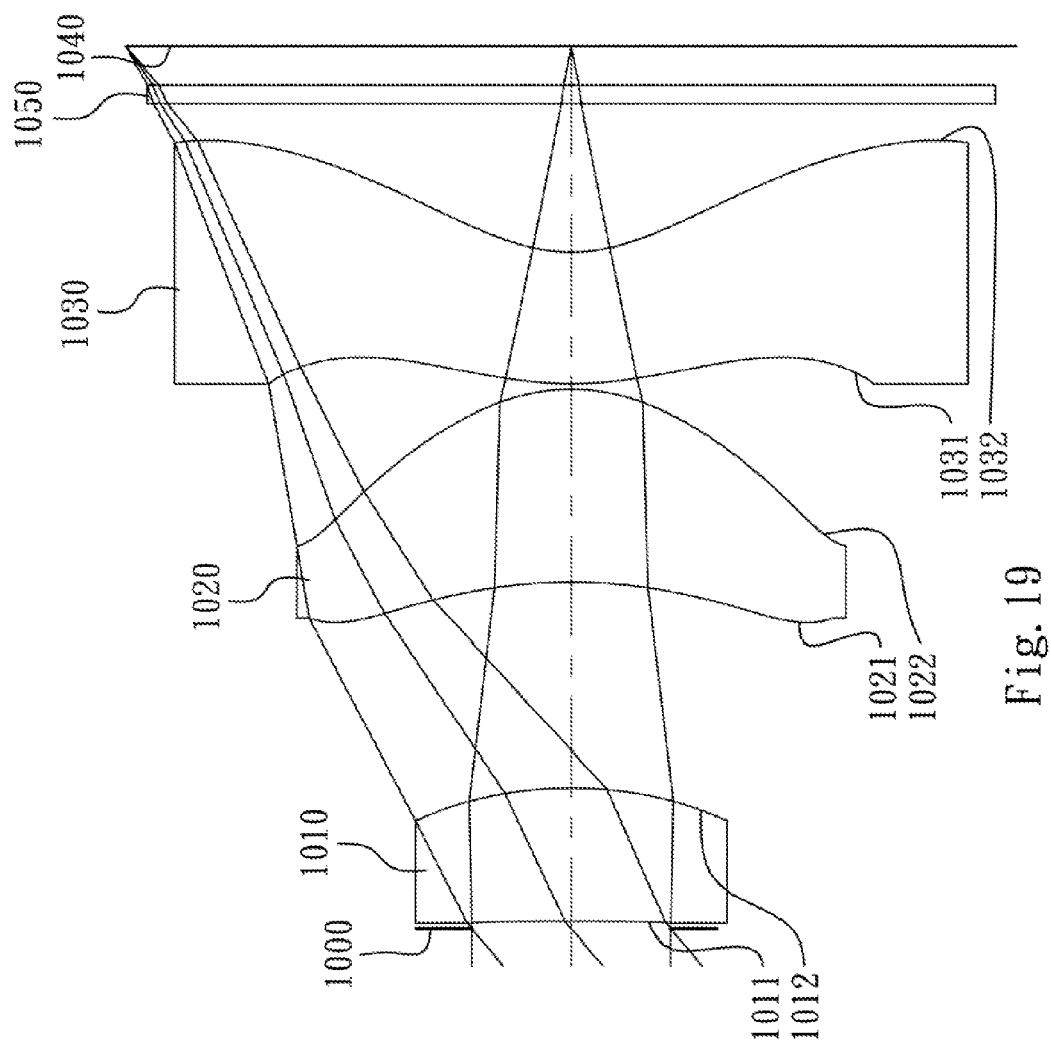
FIG. 19 is a schematic view of a photographing lens assembly according to the 10th embodiment of the present disclosure.
Figure 20:
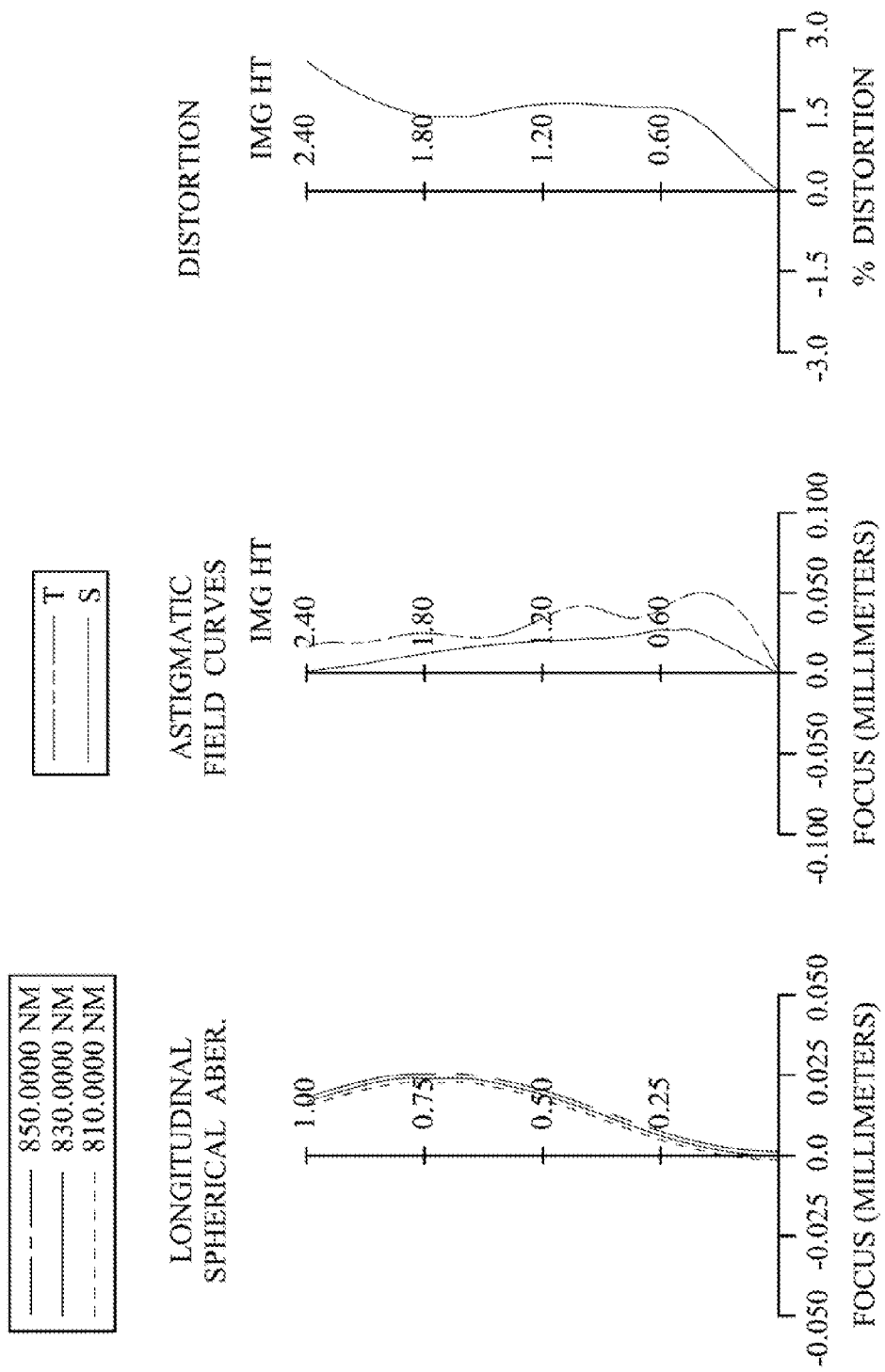
FIG. 20 shows spherical aberration curves, astigmatic field curves and a distortion curve of the photographing lens assembly according to the 10th embodiment.

FIG. 19 is a schematic view of a photographing lens assembly according to the 10th embodiment of the present disclosure. FIG. 20 shows spherical aberration curves, astigmatic field curves and a distortion curve of the photographing lens assembly according to the 10th embodiment. In FIG. 19, the photographing lens assembly includes, in order from an object side to an image side, an aperture stop 1000, a first lens element 1010, a second lens element 1020, a third lens element 1030, a filter 1050 and an image plane 1040.

The first lens element 1010 with positive refractive power has an object-side surface 1011 being concave at a paraxial region thereof and an image-side surface 1012 being convex at a paraxial region thereof. The first lens element 1010 is made of plastic material (for example, APEL-5514ML), and has the object-side surface 1011 and the image-side surface 1012 being aspheric. Moreover, the aperture stop 1000 is located closer to the object side of the photographing lens assembly than an axial vertex on the image-side surface 1012 of the first lens element 1010.

The second lens element 1020 with positive refractive power has an object-side surface 1021 being concave at a paraxial region thereof, and an image-side surface 1022 being convex at a paraxial region thereof. The second lens element 1020 is made of plastic material (for example, ARTON-D4532), and has the object-side surface 1021 and the image-side surface 1022 being aspheric.

The third lens element 1030 with negative refractive power has an object-side surface 1031 being convex at a paraxial region thereof, and an image-side surface 1032 being concave at a paraxial region thereof and being convex at a peripheral region thereof. The third lens element 1030 is made of plastic material (for example, OKP4HT), and has the object-side surface 1031 and the image-side surface 1032 being aspheric.

The filter 1050 made of glass (for example, HOYA BSC7) is located between the third lens element 1030 and the image plane 1040, and will not affect a focal length of the photographing lens assembly.

The detailed optical data of the 10th embodiment shown in Table 19 and the aspheric surface data shown in Table 20 below can be applied to the infrared wavelength range of 780 nm~950 nm.

TABLE 19

10th Embodiment
f = 2.73 mm, Fno = 2.54, HFOV = 40.5 deg.

| Surface # | | Curvature Radius | Thickness | Material | | Index | Focal length |
|---|---|---|---|---|---|---|---|
| 0 | Object | Plano | Infinity | | | | |
| 1 | Lens 1 | −57.143 (ASP) | 0.040 | Plastic | APEL-5514ML | 1.537 | 4.36 |
| 2 | | −2.261 (ASP) | 0.721 | | | | |
| 3 | Ape. Stop | Plano | 1.112 | | | | |
| 4 | Lens 2 | −2.818 (ASP) | 1.039 | Plastic | ARTON-D4532 | 1.507 | 2.59 |
| 5 | | −1.006 (ASP) | 0.030 | | | | |
| 6 | Lens 3 | 2.020 (ASP) | 0.712 | Plastic | OKP4HT | 1.614 | −3.19 |
| 7 | | 0.861 (ASP) | 0.800 | | | | |
| 8 | Filter | Plano | 0.100 | Glass | HOYA BSC7 | 1.510 | — |
| 9 | | Plano | 0.212 | | | | |
| 10 | Image | Plano | — | | | | |

Note:
The photographing lens assembly is applicable to the infrared wavelength range and reference wavelength is 830 nm.

TABLE 20

| Aspheric Coefficients | | | | | | |
|---|---|---|---|---|---|---|
| Surface # | 2 | 3 | 4 | 5 | 6 | 7 |
| k = | −1.2000E+02 | −4.4290E+00 | 2.1658E+00 | −4.5360E+00 | −1.0000E+00 | −2.8930E+00 |
| A4 = | −7.1476E−02 | −7.4875E−02 | 9.2539E−03 | −2.7421E−01 | −1.2462E−01 | −6.0035E−02 |
| A6 = | −1.2982E−02 | −3.0318E−02 | 7.0780E−02 | 2.8908E−01 | 2.1980E−02 | 1.3431E−02 |
| A8 = | −8.8748E−03 | 1.1725E−01 | −1.3952E−01 | −2.2233E−01 | −8.1650E−03 | −1.8616E−03 |
| A10 = | 2.1430E−02 | −2.0943E−01 | 1.3457E−01 | 9.7526E−02 | 2.8158E−03 | 1.7703E−04 |
| A12 = | −2.4364E−02 | 2.4212E−01 | −5.2366E−02 | −2.1168E−02 | −2.3678E−04 | −2.3759E−05 |
| A14 = | 3.2433E−03 | −1.1714E−01 | 7.5572E−03 | 2.1692E−03 | −7.8504E−05 | 1.7824E−06 |

In the photographing lens assembly according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following relationships:

| f (mm) | 2.73 | (R1 + R2)/(R1 − R2) | 1.08 |
|---|---|---|---|
| Fno | 2.54 | (R5 + R6)/(R5 − R6) | 2.49 |
| HFOV (deg.) | 40.5 | f2/f1 | 0.59 |
| CT1/T12 | 0.65 | |f2/f3| | 0.81 |
| CTmax (mm) | 1.04 | FOV (deg.) | 81.0 |
| f/R1 | −0.05 | |SAG21/CT2| | 0.19 |
| R2/f | −0.83 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A photographing lens assembly comprising, in order from an object side to an image side:
   a first lens element with positive refractive power having an object-side surface being concave at a paraxial region thereof and an image-side surface being convex at a paraxial region thereof;
   a second lens element having positive refractive power; and
   a third lens element with negative refractive power made of plastic material and having an image-side surface being concave at a paraxial region thereof and being convex at a peripheral region thereof, wherein an object-side surface and the image-side surface of the third lens element are aspheric;
   wherein a curvature radius of the object-side surface of the first lens element is R1, a curvature radius of the image-side surface of the first lens element is R2, an f-number of the photographing lens assembly is Fno, and the following relationships are satisfied:

$1.0<(R1+R2)/(R1-R2)<2.5$; and $1.5<Fno<3.0$.

2. The photographing lens assembly of claim 1, wherein an object-side surface of the second lens element is concave at a paraxial region thereof and an image-side surface of the second lens element is convex at a paraxial region thereof.

3. The photographing lens assembly of claim 2, wherein a distance in parallel with an optical axis from a maximum effective diameter position on the object-side surface of the second lens element to an axial vertex on the object-side surface of the second lens element is SAG21, a central thickness of the second lens element is CT2, and the following relationship is satisfied:

$0.17<|SAG21/CT2|<0.60$.

4. The photographing lens assembly of claim 3, wherein the curvature radius of the object-side surface of the first lens element is R1, the curvature radius of the image-side surface of the first lens element is R2, and the following relationship is satisfied:

$1.0<(R1+R2)/(R1-R2)<1.5$.

5. The photographing lens assembly of claim 3, wherein a focal length of the first lens element is f1, a focal length of the second lens element is f2, and the following relationship is satisfied:

$0.20<f2/f1<0.85$.

6. The photographing lens assembly of claim 2, wherein a maximal field of view of the photographing lens assembly is FOV, and the following relationship is satisfied:

$75$ deg.$<FOV<100$ deg.

7. The photographing lens assembly of claim 3, wherein a focal length of the second lens element is f2, a focal length of the third lens element is f3, and the following relationship is satisfied:

$0.65<|f2/f3|<1.3$.

8. The photographing lens assembly of claim 7, wherein a central thickness of the first lens element is CT1, the central thickness of the second lens element is CT2, a central thickness of the third lens element is CT3, and the following relationship is satisfied:

$CT3 \leq CT1<CT2$.

9. The photographing lens assembly of claim 1, wherein a maximum central thickness of a lens element among the first lens element, the second lens element and the third lens element of the photographing lens assembly is CTmax, and the following relationship is satisfied:

$0.30$ mm$<CTmax<0.95$ mm.

10. The photographing lens assembly of claim 9, wherein a central thickness of the first lens element is CT1, an axial distance between the first lens element and the second lens element is T12, and the following relationship is satisfied:

$0.2<CT1/T12<1.0$.

11. The photographing lens assembly of claim 9, wherein the curvature radius of the image-side surface of the first lens element is R2, a focal length of the photographing lens assembly is f, and the following relationship is satisfied:

$-1.2<R2/f<-0.4$.

12. The photographing lens assembly of claim 9, further comprising an aperture stop located closer to the object side of the photographing lens assembly than an axial vertex on the image-side surface of the first lens element.

13. The photographing lens assembly of claim 9, wherein a focal length of the second lens element is f2, a focal length of the third lens element is f3, and the following relationship is satisfied:

$0.75<|f2/f3|<1.1$.

14. The photographing lens assembly of claim 1, wherein a curvature radius of the object-side surface of the third lens element is R5, a curvature radius of the image-side surface of the third lens element is R6, and the following relationship is satisfied:

$-0.5<(R5+R6)/(R5-R6)<1.25$.

15. The photographing lens assembly of claim 14, wherein the curvature radius of the object-side surface of the first lens element is R1, a focal length of the photographing lens assembly is f, and the following relationship is satisfied:

$-0.20<f/R1<-0.03$.

16. The photographing lens assembly of claim 14, wherein the curvature radius of the object-side surface of the third lens element is R5, the curvature radius of the image-side surface of the third lens element is R6, and the following relationship is satisfied:

$0 < (R5+R6)/(R5-R6) < 1.15.$

17. The photographing lens assembly of claim 1, wherein the photographing lens assembly is applicable to an infrared wavelength range of 780 nm~950 nm.

18. The photographing lens assembly of claim 17, wherein the curvature radius of the object-side surface of the first lens element is R1, the curvature radius of the image-side surface of the first lens element is R2, and the following relationship is satisfied:

$1.0 < (R1+R2)/(R1-R2) < 1.5.$

* * * * *